US009193571B2

(12) United States Patent
Koch

(10) Patent No.: US 9,193,571 B2
(45) Date of Patent: Nov. 24, 2015

(54) UNLOADING AND LOADING CRANE ARRANGEMENT, CONTAINER TERMINAL AND METHOD FOR UNLOADING AND LOADING A SHIP

(75) Inventor: Franciscus Koch, Goes (NL)

(73) Assignee: RAADGEVEND INGENIEURSBURO F. KOCH B.V., Goes (NL)

(*) Notice: Subject to any disclaimer, the term of this patent is extended or adjusted under 35 U.S.C. 154(b) by 93 days.

(21) Appl. No.: 13/983,605

(22) PCT Filed: Feb. 3, 2012

(86) PCT No.: PCT/NL2012/050061
§ 371 (c)(1),
(2), (4) Date: Sep. 10, 2013

(87) PCT Pub. No.: WO2012/105842
PCT Pub. Date: Aug. 9, 2012

(65) Prior Publication Data
US 2013/0343850 A1 Dec. 26, 2013

(30) Foreign Application Priority Data

Feb. 3, 2011 (NL) .................................... 2006132
Apr. 19, 2011 (NL) .................................... 2006628
Apr. 19, 2011 (NL) .................................... 2006629
Aug. 8, 2011 (NL) .................................... 2007232

(51) Int. Cl.
B66C 19/00 (2006.01)
B65G 63/00 (2006.01)
(Continued)

(52) U.S. Cl.
CPC ............... *B66C 19/002* (2013.01); *B61J 1/10* (2013.01); *B65G 63/004* (2013.01); *B65G 67/603* (2013.01); *B66C 13/18* (2013.01); *B66C 23/82* (2013.01)

(58) Field of Classification Search
USPC ......... 212/262, 299, 300, 307, 309, 311, 323, 212/325; 414/139.4, 139.9, 140.3, 140.9, 414/141.1, 141.2, 141.3, 141.4
See application file for complete search history.

(56) References Cited

U.S. PATENT DOCUMENTS 1,107,378 A * 8/1914 Titcomb ..................... 414/141.4
1,111,100 A * 9/1914 Sawyer ......................... 212/286
(Continued)

FOREIGN PATENT DOCUMENTS

EP          1 923 338        5/2008
JP       2000255786 A  *  9/2000  ............. B65G 63/00
WO         96/09242         3/1996

OTHER PUBLICATIONS

International Search Report dated Oct. 17, 2012; corresponding to PCT/NL2012/050061.

Primary Examiner — Gregory Adams
(74) Attorney, Agent, or Firm — Young & Thompson

(57) ABSTRACT

An unloading and loading crane arrangement (35) includes: a boom (37), in particular a projecting boom, for unloading cargo from or loading cargo onto a ship using a gripper (7) attached to the boom; and a transverse conveyor track (77) for moving the unloaded cargo inland in the transverse direction and moving the cargo to be loaded shipward. The arrangement is provided with a conveyor floor (75) with a vehicle (81) which can be moved across the latter at least in the transverse direction for displacing cargo. The conveyor floor has a first conveyor floor part (751) where the vehicle can receive a cargo from the gripper and a cargo on the vehicle can be presented to the gripper, and has a second conveyor floor part (752) for presenting cargo from the vehicle to the transverse conveyor track (77) and receiving cargo on the vehicle from the transverse conveyor track.

17 Claims, 30 Drawing Sheets

(51) Int. Cl.
*B66C 13/18* (2006.01)
*B65G 67/60* (2006.01)
*B66C 23/82* (2006.01)
*B61J 1/10* (2006.01)

(56) References Cited

U.S. PATENT DOCUMENTS

| | | | | |
|---|---|---|---|---|
| 1,190,822 | A * | 7/1916 | Vandevelde | 414/140.5 |
| 1,305,802 | A * | 6/1919 | Hulett | 414/141.7 |
| 2,366,574 | A * | 1/1945 | Taylor | 212/325 |
| 2,793,766 | A * | 5/1957 | Fetchko | 414/141.7 |
| 2,995,259 | A * | 8/1961 | Rose | 414/141.2 |
| 4,018,349 | A | 4/1977 | Hupkes | |
| 5,775,866 | A * | 7/1998 | Tax et al. | 414/140.3 |
| 5,951,226 | A * | 9/1999 | Fantuzzi | 414/141.3 |
| 6,845,873 | B1 * | 1/2005 | Chattey | 212/270 |
| 2008/0219804 | A1 | 9/2008 | Chattey | |
| 2009/0208312 | A1 * | 8/2009 | De Jong et al. | 414/140.3 |

* cited by examiner

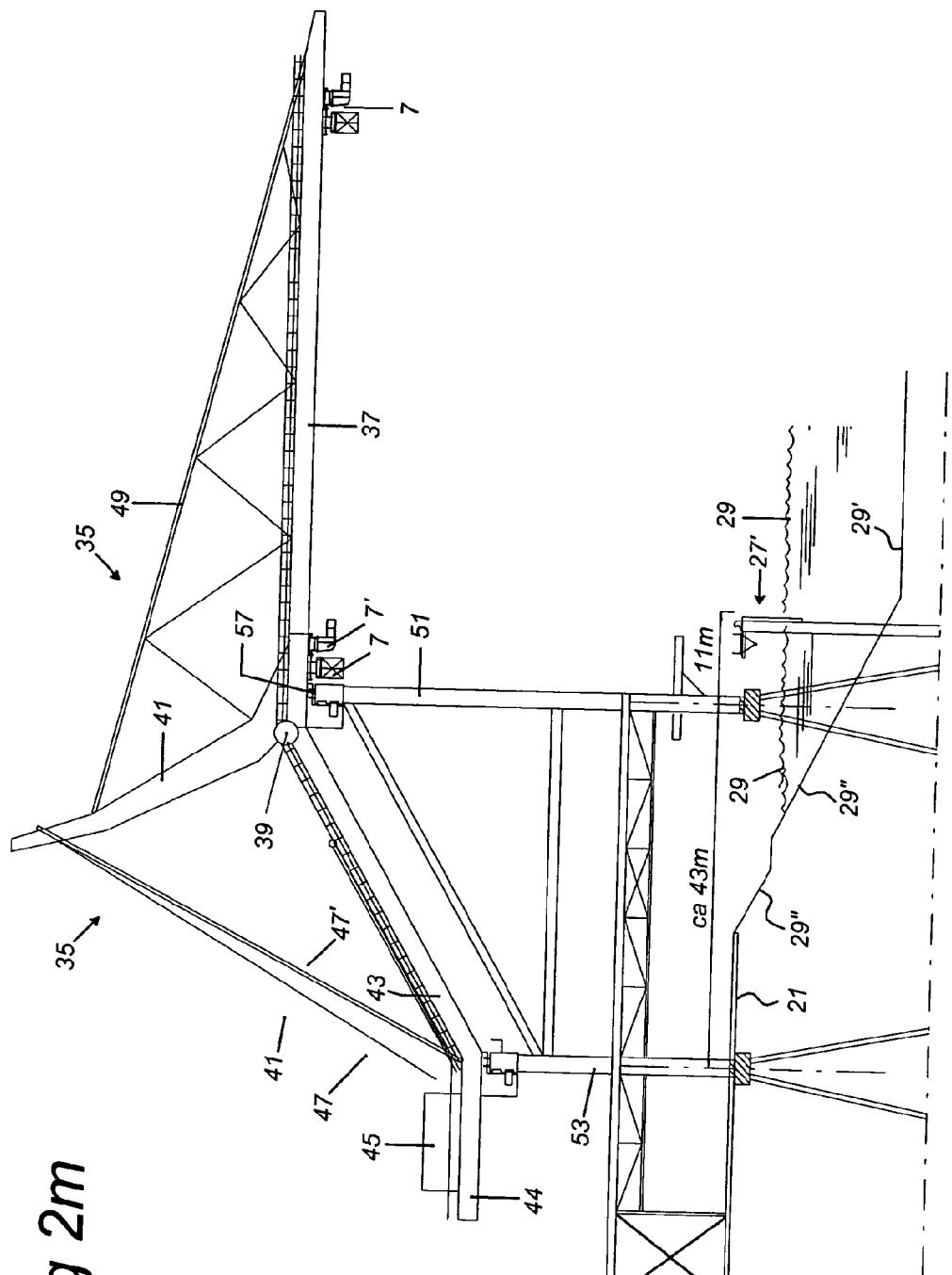

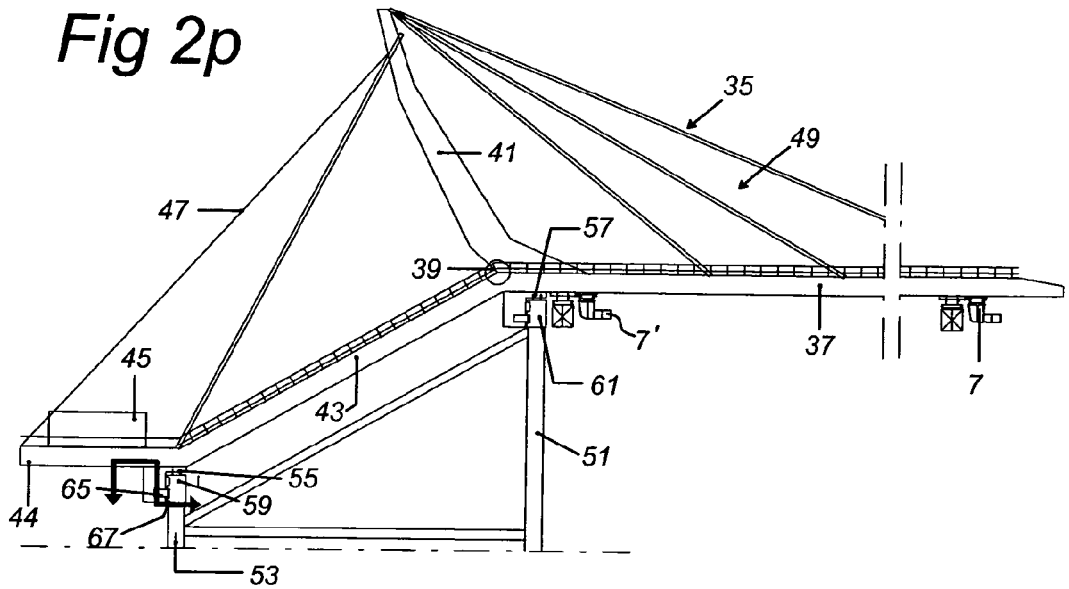

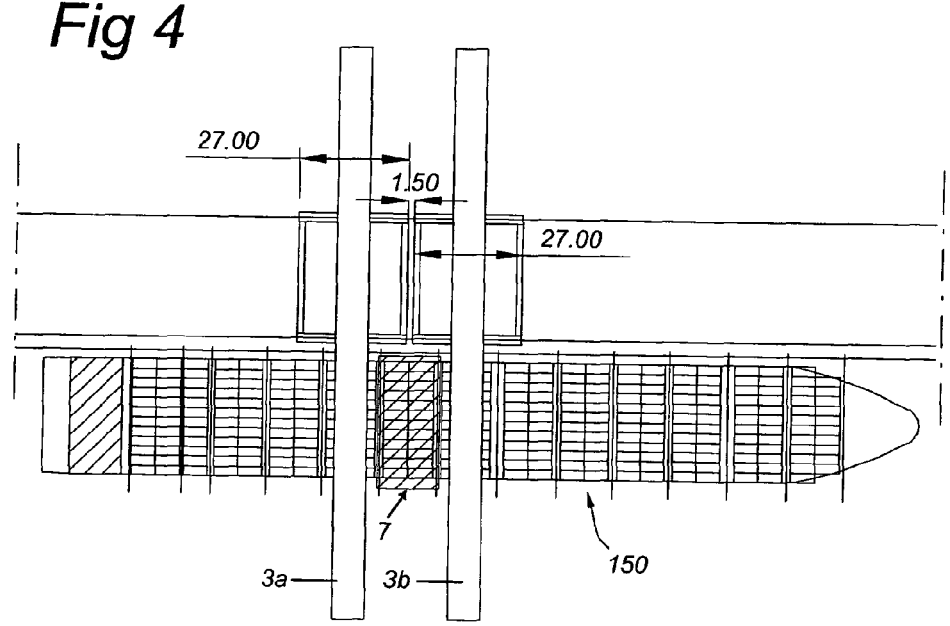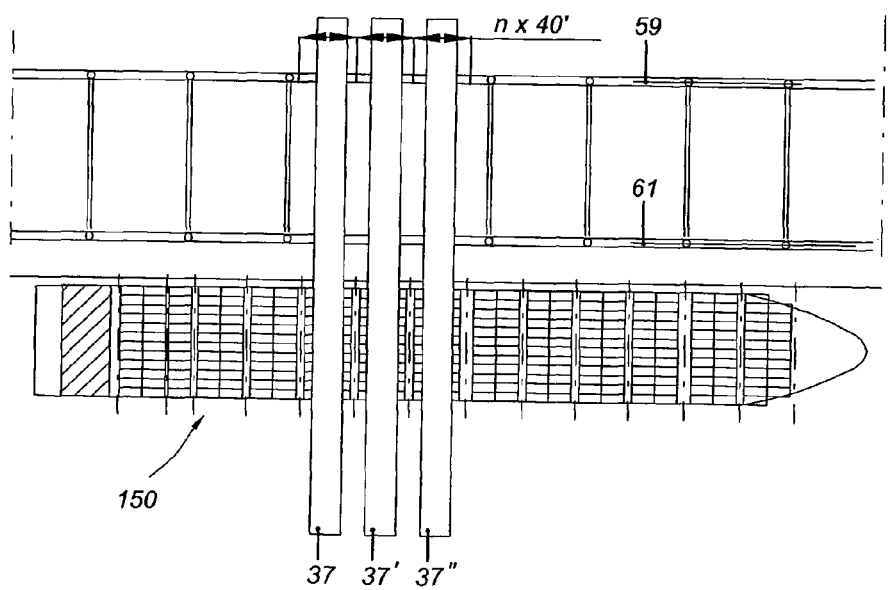

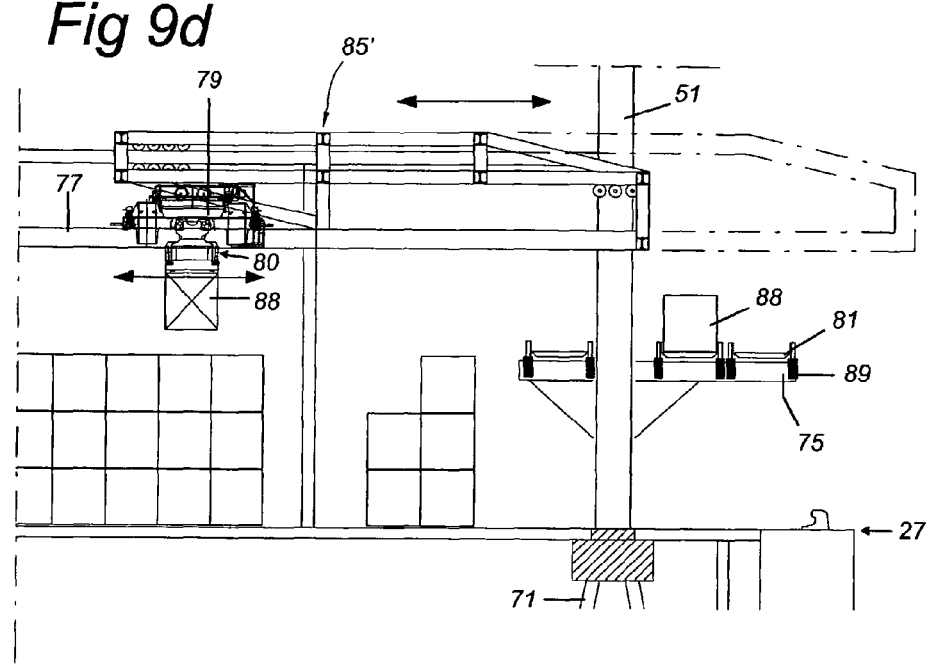
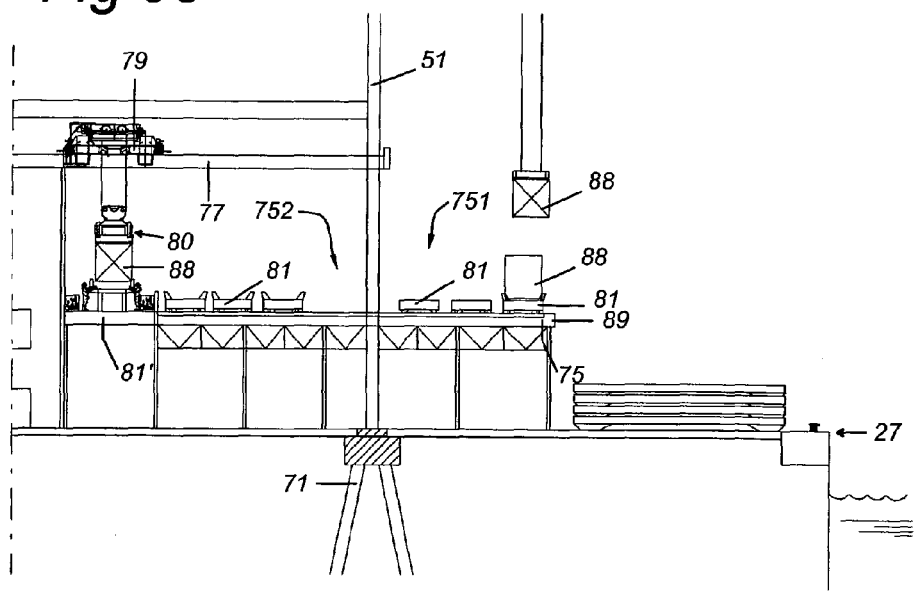

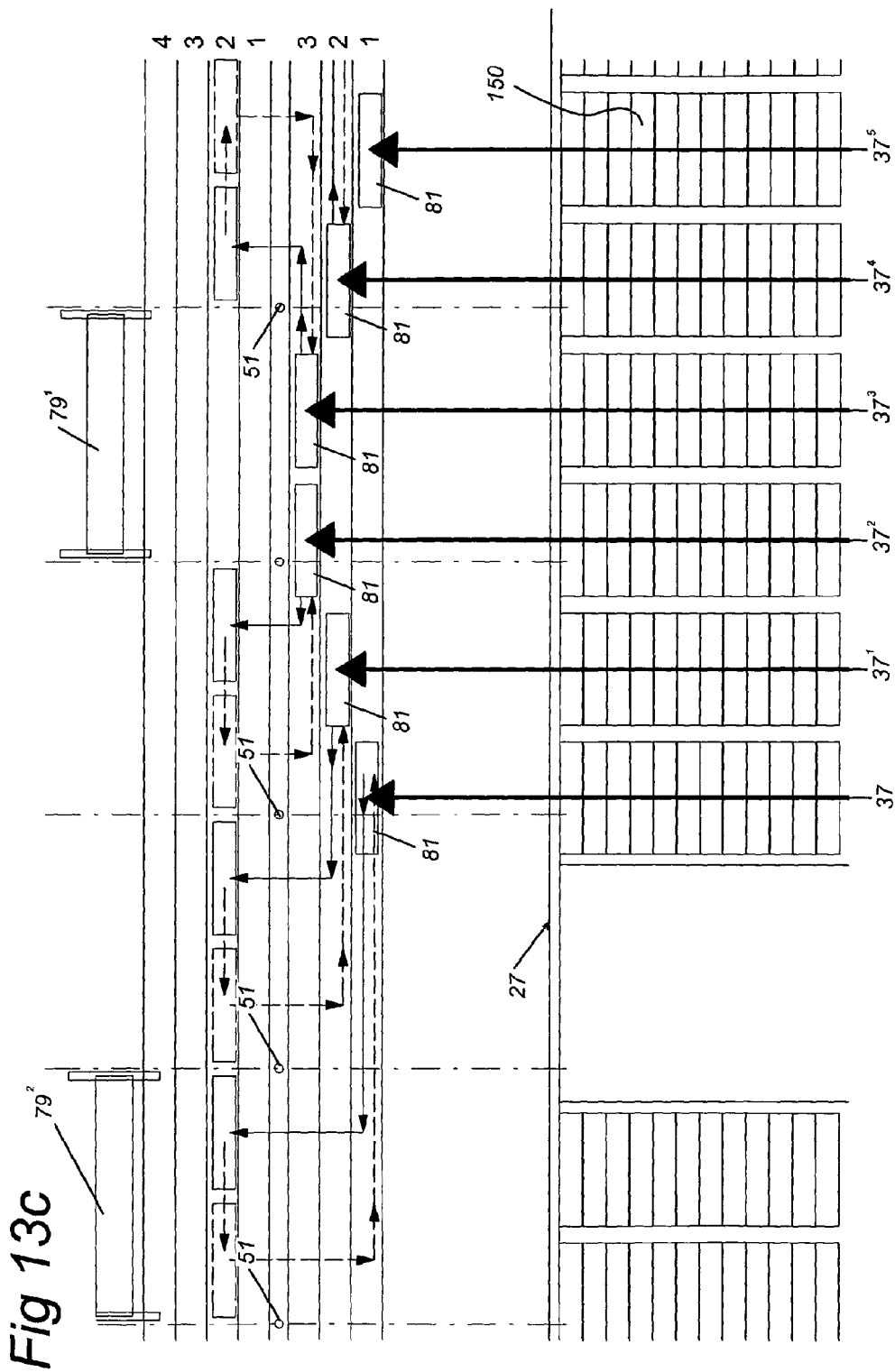

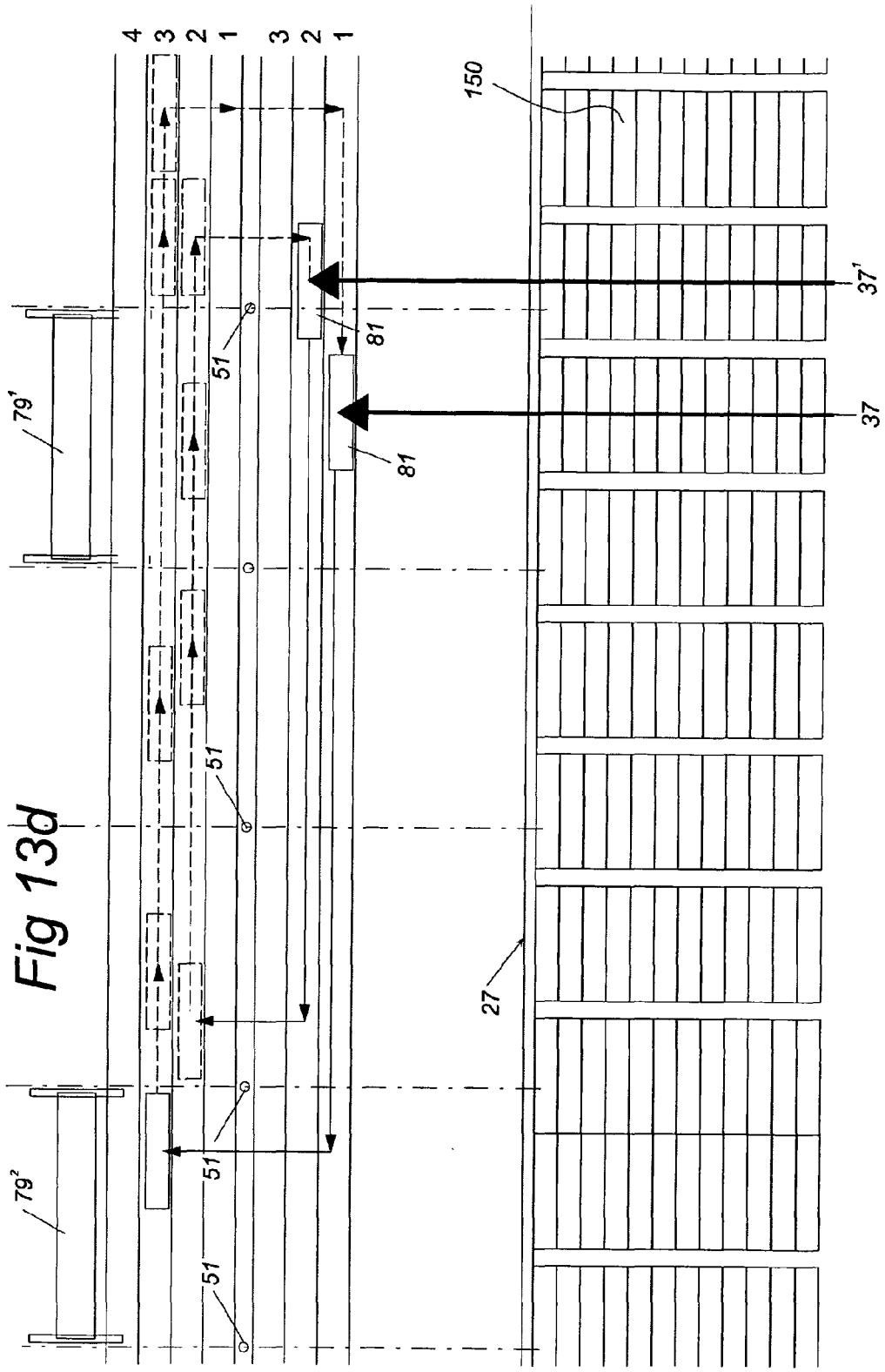

UNLOADING AND LOADING CRANE ARRANGEMENT, CONTAINER TERMINAL AND METHOD FOR UNLOADING AND LOADING A SHIP

The invention relates to an unloading and loading crane arrangement with a boom, in particular a projecting boom, for loading a ship from a quay surface or unloading a ship to the quay surface using a gripper attached to boom, which boom is hingedly connected to an arm via a hinge point. The invention furthermore relates to a container terminal comprising an unloading and loading crane module, a buffer-in area and a stack area. The invention furthermore relates to a method for unloading a ship by means of an unloading and loading crane module.

There is a worldwide trend to design and construct new container terminals for ports in such a manner that loading and unloading of container ships using so-called Ship-To-Shore (STS) cranes can be carried out more quickly, so that the turnaround time of container ships in container ports can be reduced. As a consequence, it is necessary to adapt the cargo handling on the terminal to make it possible for loading and unloading to take place simultaneously, so that as few empty runs as possible take place, which is also referred to as dual cycling.

FIG. 1 shows a diagrammatic illustration of an existing unloading and loading crane arrangement 1. Such an arrangement 1 can travel in its entirety along two rails 23 and 25 which extend in the longitudinal direction, substantially parallel to the quay 27, in particular parallel to the water side of the quay 27. The rail 25 is situated closest to a water side 29 of the quay 27 on which container ships can dock. The rail 23 is preferably recessed in the surface 21 of the quay 27, so that vehicles can easily move transversely to the quay, in a direction away from the water 29, at right angles to the rail 23 without being hampered by the rail. The rail 25 can therefore be installed on instead of in the quay surface 21.

The unloading and loading crane arrangement 1 comprises wheels 31 by means of which it can move over the rails 23, 25 in a longitudinal direction along the quay 27, i.e. at right angles to the transverse direction.

The unloading and loading crane arrangement 1 also comprises a boom 3 underneath which a gripper or hoist 7 is fitted which can be moved in the transverse direction along the underside of the boom 3 by means of a known drive unit. Usually, a cab 7' for an operator is provided near the gripper 7. The term gripper or hoist is intended to mean any device which is provided on a boom 3 and which can grip containers on a container ship 150 and lift them. The boom 3 is attached to the rest of the unloading and loading crane arrangement by means of a hinge 33. Said rest forms a fixed structure which consists of various parts. These include an arm 13 which extends in the longitudinal direction next to the boom 3 and is configured in such a manner that the hoist 7 can move to the underside of the arm 13 along the underside of the boom 3 and vice versa. In a position under the arm 13, the hoist is denoted by reference numeral 7". Arm 13 rests on structure 15 which in turn rests on columns 17 and 19. The columns 17, 19 are provided with said wheels 31. The area 2 below hoist 7" and arm 13, between the columns 17 and 19, is also referred to as buffer-in area 2, and is used to temporarily store containers.

The hoist 7 can be moved downwards from the boom 3 by means which are known per se in order to grip a certain cargo in the hold of a ship, for example a container, and can subsequently be moved upwards again.

On the arm 13, a machine housing 9 is arranged which contains a machine which is known per se and which is connected to the boom 3 by means of cables 5. An operator can control the machine in such a manner that the boom 3 with the cables 5 can be pulled up around hinge 33, so that ships can moor more easily without hitting the boom 3. Reference numeral 3' denotes the boom in the upright position.

On the arm 13, a counterweight 11 is arranged which has a weight which is such that, together with the own weight of the STS crane, the unloading and loading crane arrangement is balanced on the rails at all times, irrespective of the fact whether the hoist 7 has or has not gripped a load.

The fixed structure of the unloading and loading crane arrangement 1 usually comprises four legs or columns 17, 19 underneath which the wheels 31 are fitted and which bear the entire weight of the unloading and loading crane arrangement.

Traditional unloading and loading crane arrangements as illustrated in FIG. 1 and FIG. 12 are used to take containers from a ship using a hoist 7 and placing them in a so-called buffer-in area 2. With known devices, this is usually the area underneath arm 13 and between columns 17 and 19. There, the containers are then picked up by, for example, a straddle carrier 103 and taken to a storage depot 4 further inland, where they are later, for example, loaded onto purpose-built lorries 6 in order to be transported on the road.

This makes it necessary for the rails 31 which are situated inland to be fitted recessed in the quay so that the straddle carriers can drive on them. Such a recessed structure requires more maintenance and it also results in vehicles (for example straddle carriers 103) being situated underneath the unloading and loading crane arrangement during operation, which requires coordination with regard to the dropping and picking up of containers in the buffer-in area by hoist 7.

The present structure inter alia has the following drawbacks. Known unloading and loading crane arrangements 1 have wheels 31 by means of which the arrangements can be displaced on rails 23, 25. No tensile forces can be transmitted between the wheels 31 and the rails 23, 25, so therefore the devices have to be made heavy in order to achieve the desired balance, in particular by means of a large own weight and by fitting large amounts of ballast, for example in the form of counterweight 11. The large own weight and the use of ballast is disadvantageous due to the fact that the material used is expensive, that more power is required to displace the arrangement as a result of the increased mass, and the increased requirements regarding the strength and stability of the rails 23, 25 and the quay 27 as a result of the increased weight. The fact is that if there are two such parallel rails 23, 25 and the crane has four wheel sets 31, almost half the entire weight of such cranes can be at any position on said rails at any point in time. For this reason, quays on which container ships moor have, until now, had to be very sturdy and strong. When building a container terminal on land with existing quays, said quays have to be replaced and on land with no quays, no container terminal can be built without a new quay.

Another drawback is the fact that, as a result of the fact that ships are becoming ever wider, the boom 3 has to project further from structure 15, which increases the pressure load on rail 25 during loading and unloading and increases the need for greater ballast 11 over rail 23. With the traditional method, the waterside rail 25 is for this reason positioned as closely as possible to the edge of quay 27, which limits the working space on the outer side of rail 25.

Furthermore, rails in grooves in the quay also have the drawback that the grooves require cleaning in order to keep them free and usable, and that they form a risk since they can cause employees to fall or stumble. Moving unloading and loading crane arrangements 1 on the quay are also a risk to all the other traffic on the quay.

Although EP 1 923 338 A1 shows a variant of the device from FIG. 1 which addresses the problems regarding the rails in the quay by placing the rails in a raised position, but this device has new drawbacks. Thus, additional operations are, for example, required if a hoisted load according to EP 1 923 338 A1 has to be brought past a column of the rails. As a result thereof, this solution is not very practical. Both the amount of material used and the total mass are not significantly less in this solution than in the described prior art.

Another problem which is associated with the known cranes at present is the fact that they have a counterweight which is situated at a considerable height. Said counterweight increases the material costs of the crane. A relatively high centre of gravity of the crane, partly due to the counterweight, is not advantageous with regard to the stability and safety of the structure.

One of the problems with a shorter unloading time is that more transportation equipment and a larger surface area will be needed for the temporary storage (buffer-in) of containers before they can be taken to a desired location, for example using straddle carriers, tractors, Automated Guided Vehicles (AGVs), etc., to a stack at the storage depot, where they can then be picked up by a lorry.

The way current terminals are laid out, a large amount of space is required in order to be able to transport the containers from underneath the STS cranes (buffer-in area) to the stack-area. Irrespective of whether these transports take place by means of AGVs or by means of straddle carriers, both means of transport require a significant amount of manoeuvring space in an area directly behind the STS area.

It is an object of the invention to solve at least one or some of these problems.

The invention has several aspects which are claimed separately in the independent claims, but which can also be applied in any desired combination.

The invention provides an unloading and loading crane arrangement comprising:
 a boom, in particular a transverse projecting boom, for unloading cargo from or loading cargo onto a ship using a gripper attached to the boom; and
 a transverse conveyor track for moving the unloaded cargo inland in the transverse direction and moving the cargo to be loaded shipward. The transverse conveyor track can be provided with a transport means, such as a further gripper or robot moveable along the track, for moving cargo. The transport means can also have the form of a belt, e.g. a conveyor belt. The arrangement is provided with a conveyor floor adapted to support a vehicle which can be moved across the latter at least in the transverse direction for displacing cargo. The vehicle can be provided with the conveyor floor. The conveyor floor has a first conveyor floor part where the vehicle can receive a cargo from the gripper and a cargo on the vehicle can be presented to the gripper, and has a second conveyor floor part for presenting cargo from the vehicle to the transverse conveyor track and receiving cargo on the vehicle from the transverse conveyor track.

By means of the conveyor floor, cargo can be moved efficiently and quickly by vehicle, after the cargo has been unloaded from the ship using the gripper, in a longitudinal direction to the correct transverse conveyor track by means of which the cargo can be transported to the downstream store. Some of the advantages of the conveyor floor are that there is less danger for staff on the quay because containers do not have to be placed at quay level. In addition, there is no need for a quay and thus the crane and conveyer floor arrangement can also be provided partly above water. The further advantages of this embodiment and the following embodiments are described in more detail with reference to the figures.

In an embodiment of the invention, the conveyor floor is partly or completely above a quay surface or a water surface. It is not necessary for the quay surface to be situated directly beneath the conveyor floor. A partial off-shore installation of the crane module, in which, for example, a supporting column is placed in the bed, is also possible. The conveyor floor is then still above, that is to say higher than the quay surface which is situated further inland.

In an embodiment of the invention, the first conveyor floor part does not overlap with the second conveyor floor part. This makes it possible to construct the gripper and transverse conveyor track in a simpler and thus less expensive manner, as there is no longer risk of both conveying devices for cargo obstructing each other.

In an embodiment of the invention, The boom is hingedly connected to an arm via a hinge point, which arm is placed on at least one landside guide and one waterside guide, which guides are supported by respective landside and waterside columns. By placing the guides on columns, that is at a raised level, the safety at quay level is improved. In addition, the measure makes off-shore installation possible. Also, fewer demands are made with regard to the strength of the ground (quay or bed) in which the columns are anchored, compared with known arrangements in which rails are provided in the quay surface.

In an embodiment of the invention, the first conveyor floor part extends on the waterside of the waterside columns, the second conveyor floor part extends on the landside of the waterside columns. The waterside row of columns then forms the partition between the two floor parts. The gripper then does not have to be able to go beyond the waterside row of columns, which is advantageous in terms of structural engineering.

In an embodiment of the invention, at least one column or one row of columns is placed in a bed. As a result thereof, the expensive quay wall can partly or completely be dispensed with in an advantageous manner.

In an embodiment of the invention, the vehicle is a self-propelled vehicle. The vehicle can comprise a diesel-electric propulsion system. In an embodiment, the vehicle comprises an electric engine and the conveyor floor is provided with an electric supply, for example in the form of powered rails. The vehicle can drive on rails or in grooves in the conveyor floor or freely on a flat part of the conveyor floor.

In an embodiment, the AGVs are arranged to move in predetermined paths or loops. The AGV paths may be configured to avoid crossings and unnecessary turns. This allows the AGVs to be provided with electric engines, which are continuously powered through a power rail on the conveyor floor. In that case, the AGVs do not need to be provided with diesel engines, as is the case with current AGVs.

In an embodiment of the invention, the vehicle is an Automated Guided Vehicle (AGV), preferably an All-Directional AGV or an Two-Directional AGV.

In an embodiment of the invention, sufficient space is provided on the quayside adjacent to the conveyor floor for stacking hatch covers, so that the hatch covers can then be stacked in this space, for example on the quay floor between the crane arrangement and the ship, while a ship is being loaded or unloaded.

In an embodiment of the invention, the conveyor floor is provided with one or more longitudinal conveyor tracks over which the vehicle can be displaced. In an embodiment of the invention, two longitudinal conveyor tracks are provided, wherein controllable points are provided between the at least two conveyor tracks for transferring the vehicle from one conveyor track onto the other conveyor track. As a result thereof, the cargo which is unloaded from a ship can also be transported in the longitudinal direction before being moved further inland. As an alternative to providing one or more longitudinal conveyor tracks on the conveyor floor, it is also possible to use, for example, a so-called All-Directional Automated Guided Vehicle (AGV) which is guided, for example, by a laser or a Two-Directional AGV with direct electrical power supply from the conveyer floor construction.

In an embodiment of the invention, the arrangement is furthermore provided with a transverse conveyor track which adjoins the waterside columns and is intended for moving cargo from the conveyor floor inland. The transverse conveyor track can advantageously be used to transport cargo between the conveyor floor and the parts of the container terminal which are further inland, such as the buffer-in area, stack area and optional scan area.

In an embodiment of the invention with at least two transverse conveyor tracks, the lane width between the at least two transverse conveyor tracks is an integer multiple of a more or less standardized container bay width of a ship. This makes it possible to place the cargo in substantially the same position in the buffer-in area and the stack area as on the ship.

In an embodiment of the invention, the transverse conveyor track is provided with a subconveyor track which, in a first position, is situated substantially above the conveyor floor and, in a second position, leaves the space above the conveyor floor free. In an embodiment of the invention, the subconveyor track can be pivoted with respect to the conveyor track by means of a hinge. In an alternative embodiment of the invention, the subconveyor track is displaceable in the longitudinal direction of the transverse conveyor track via a displacement device. In this way, the subconveyor track makes the conveyor floor accessible to the gripper of the boom when this is required.

In an embodiment of the invention, the transverse conveyor track and/or subconveyor track is provided with a robot with gripper for gripping cargo which can be displaced over the tracks. This robot can be operated manually or may be (substantially) automated.

As an alternative to providing a subconveyor track, the aforementioned All-Directional AGV or Two-Directional AGV can also be used to move cargo on the conveyor floor. These AGVs are capable of moving both in the longitudinal and in the transverse direction without changing the orientation of the cargo it is transporting. As a result thereof, the AGV can position itself in a spot where the AGV is accessible to the gripper of the boom and can then move in the longitudinal and transverse direction to a spot which is accessible to the gripper of the transverse conveyor track. The use of such AGVs then makes the pivotable or slidable subconveyor track redundant.

The invention furthermore provides a container terminal, comprising:
   an unloading and loading crane module having one or more features as described above, which module is secured in a quay and/or a bed by means of columns;
   a buffer-in area which, depending on the presence of a quay surface, may be situated between columns or further inland, for temporarily storing cargo;
   a stack area which may be situated substantially on the inland side of the buffer-in area for longer term storage of cargo;
   wherein the transverse conveyor track of the unloading and loading crane module is configured to move cargo from the conveyor floor selectively to the buffer-in area or the stack area.

In an embodiment of the invention, the terminal is furthermore provided with a loading and unloading area for loading cargo onto and unloading cargo from lorries and trains, wherein the conveyor track is also configured to move cargo from and to the loading and unloading area. As a result thereof, cargo can be taken from the conveyor floor to a lorry or a train and vice versa in one smooth operation, as it were.

In an embodiment of the invention, the terminal is furthermore provided with a scan area provided with a scan device configured to inspect cargo placed therein or being displaced therein, wherein the conveyor track is also configured to move cargo from and to the scan area. In an embodiment of the invention, the scan area is situated between the buffer-in and the stack area. In an alternative embodiment of the invention, the scan area is situated substantially between the columns and at substantially the same level as the conveyor floor. As a result of integrating the (preferably partly automated) scan area in this way, a high frequency of container scans can be achieved.

In an embodiment of the invention, the scan area is provided with one or more scanning tracks for displacing cargo and/or a mobile scanning device thereon.

The invention furthermore provides a method for unloading a ship with an unloading and loading crane module, which method comprises:
   lifting cargo from a ship using a gripper of the unloading and loading crane module;
   placing the cargo on a vehicle on a first conveyor floor part of a conveyor floor;
   moving the vehicle to a second conveyor floor part of the conveyor floor;
   directly and selectively moving the cargo from the conveyor floor to a buffer-in area, scan area, stack area or loading and unloading area.

In an embodiment of the invention, the cargo is moved from the ship onto a vehicle on a longitudinal conveyor tack of the conveyor floor, after which this cargo is moved in the longitudinal direction before being selectively moved further inland (in a transversal direction).

In an embodiment of the invention, an unloading and loading crane and/or a container terminal as described above are used.

The invention furthermore provides a Two-Directional Automated Guided Vehicle for carrying cargo, the vehicle comprising longitudinal wheels oriented in a longitudinal direction and transverse wheels oriented in a transverse direction. In an embodiment according the invention, the longitudinal or the transverse wheels are arranged to be retractable, so that the vehicle can selectively be supported by the longitudinal or transverse wheels.

The invention will be explained by means of various figures which show diagrammatic exemplary embodiments of various aspects thereof. Someone skilled in the art will understand that parts of these figures are intended to be illustrative and that standard parts can be replaced by technically equivalent parts which fulfil the same or virtually the same function. It is also possible to change the shape of parts compared to those in the figures without their technical function changing substantially.

The entire structure may be made from standard materials which are known to the person skilled in the art. However, the inventive idea can also be embodied using materials which can fulfil the correct function but which will only become available in the future. Where the figures show relative or absolute dimensions, these are intended as an example and the invention is not limited by the illustrated dimensions or design or position with respect to the shore or the mutual relationships between the dimensions given.

FIG. 1 shows a diagrammatic illustration of a known unloading and loading crane arrangement;

FIGS. 2*a*-2*p* show diagrammatic illustrations of an unloading and loading crane arrangement according to aspects of the invention;

FIGS. 3*a*-*b* show a diagrammatic illustration in perspective of an unloading and loading crane arrangement according to aspects of the invention;

FIG. 4 shows a diagrammatic top view of a known unloading and loading crane arrangement;

FIG. 5 shows a diagrammatic top view of an unloading and loading crane arrangement according to an aspect of the invention;

Figure 7A:
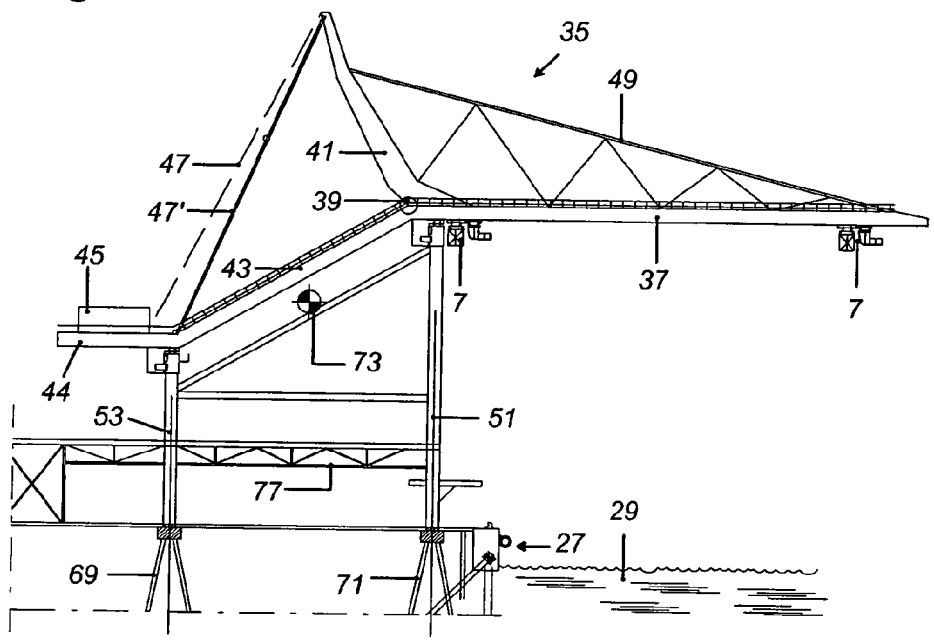
Figure 7B:
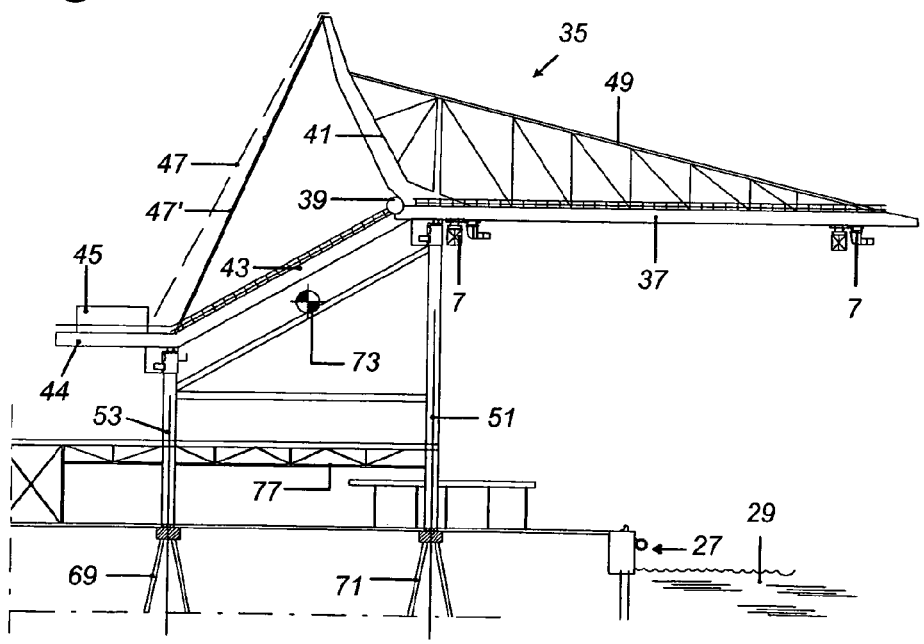
Figure 10A:
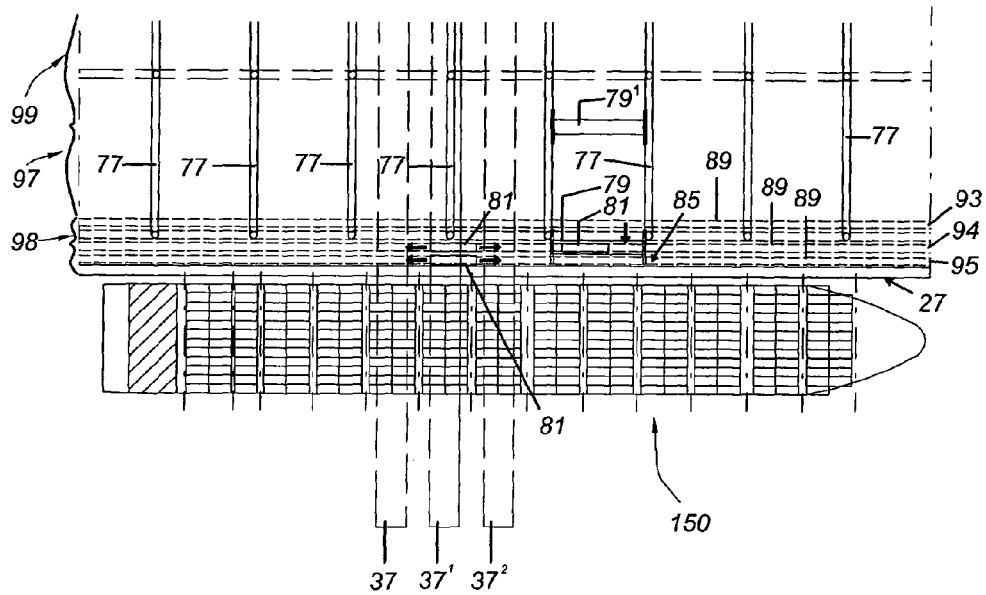
Figure 10B:
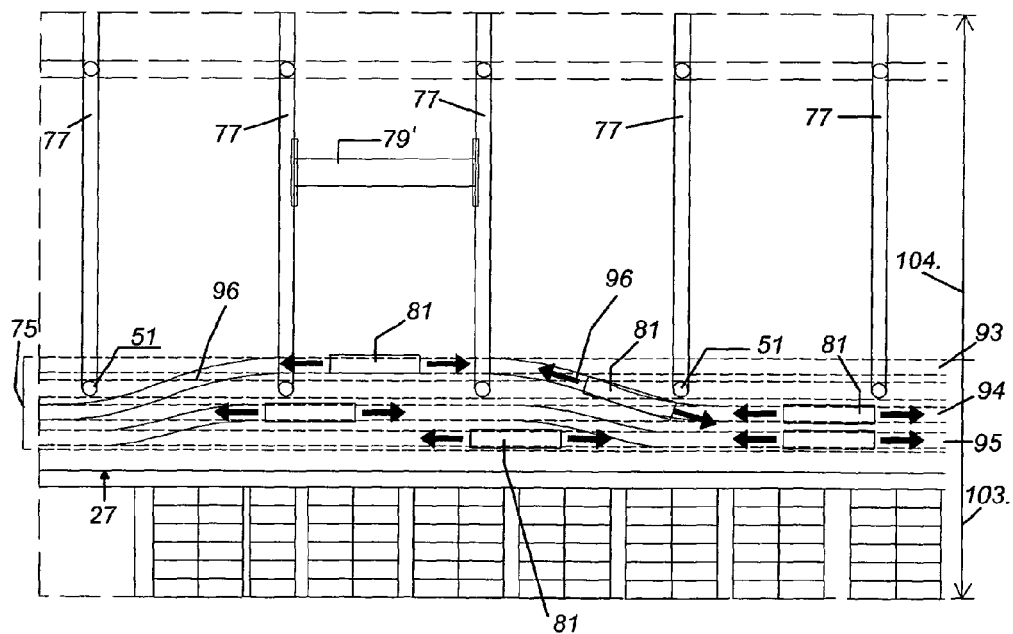
Figure 11A:
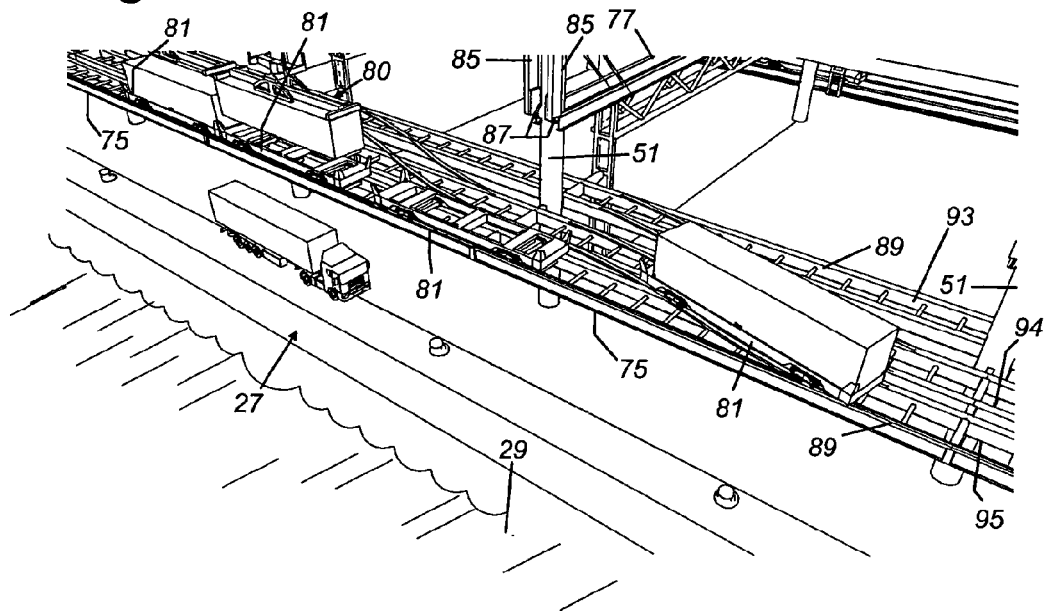
Figure 11B:
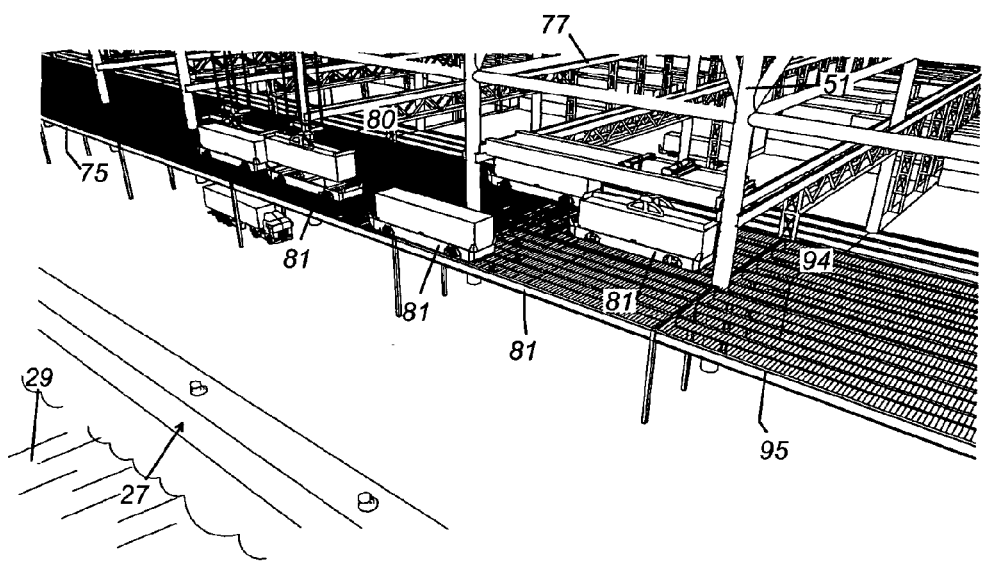
Figure 12:
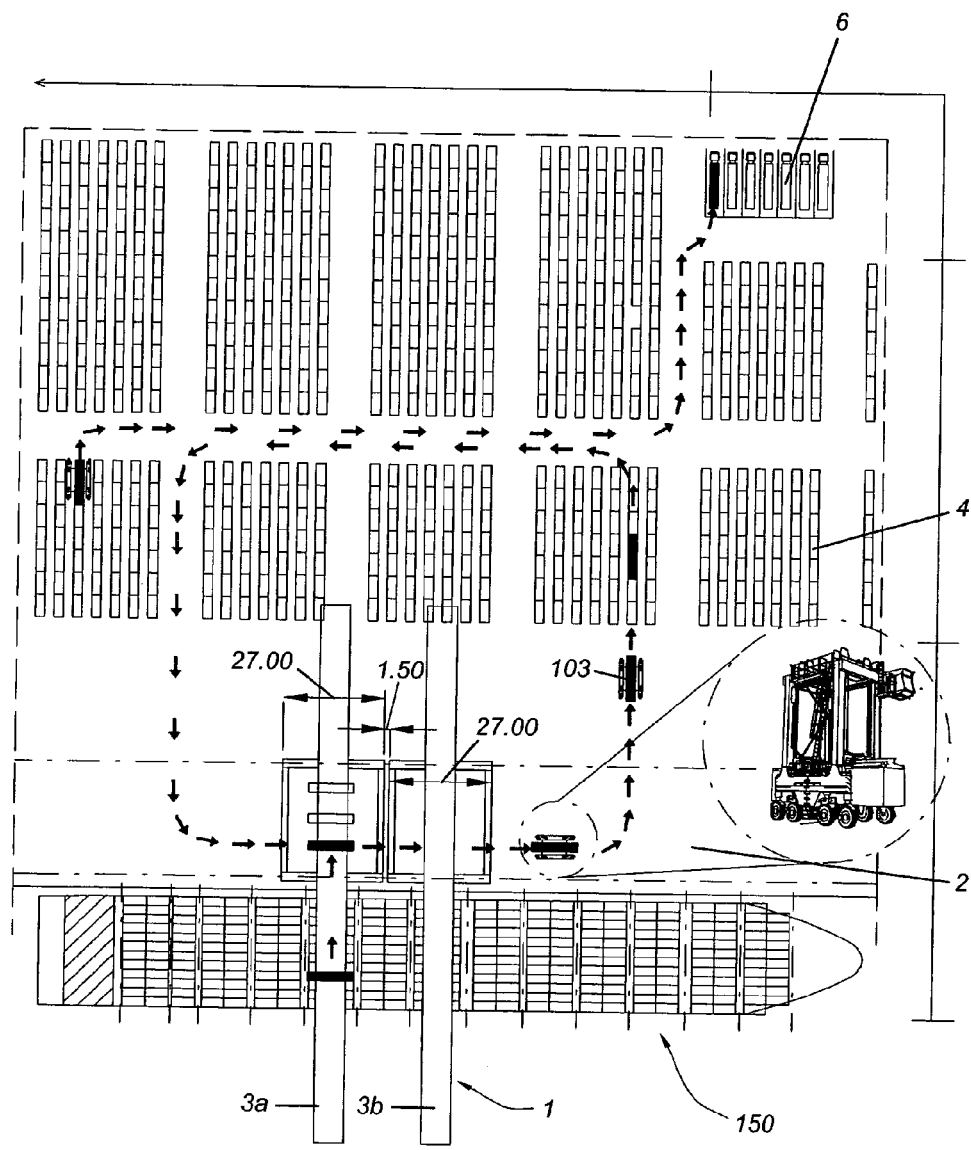
Figure 13A:
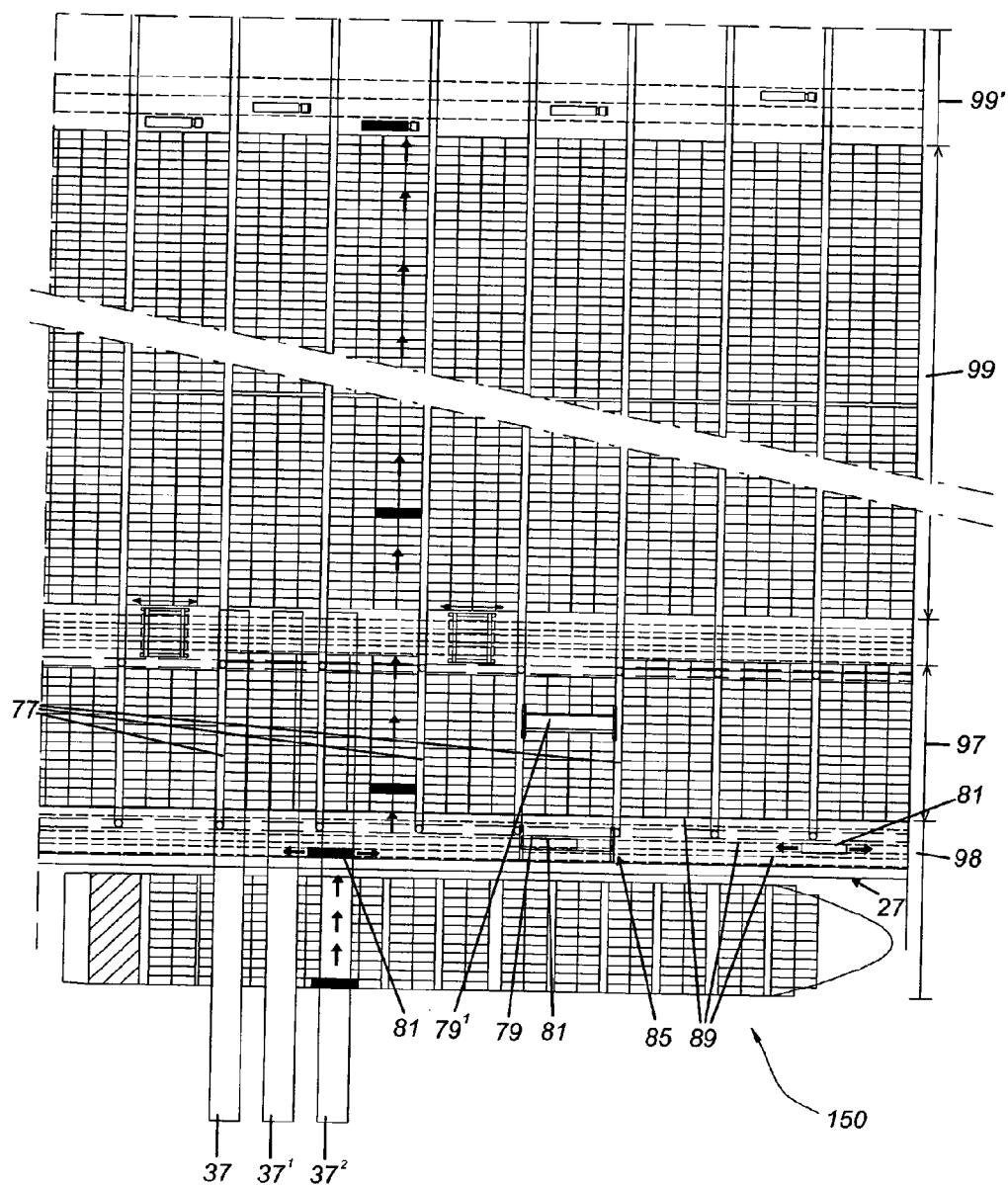
Figure 13B:
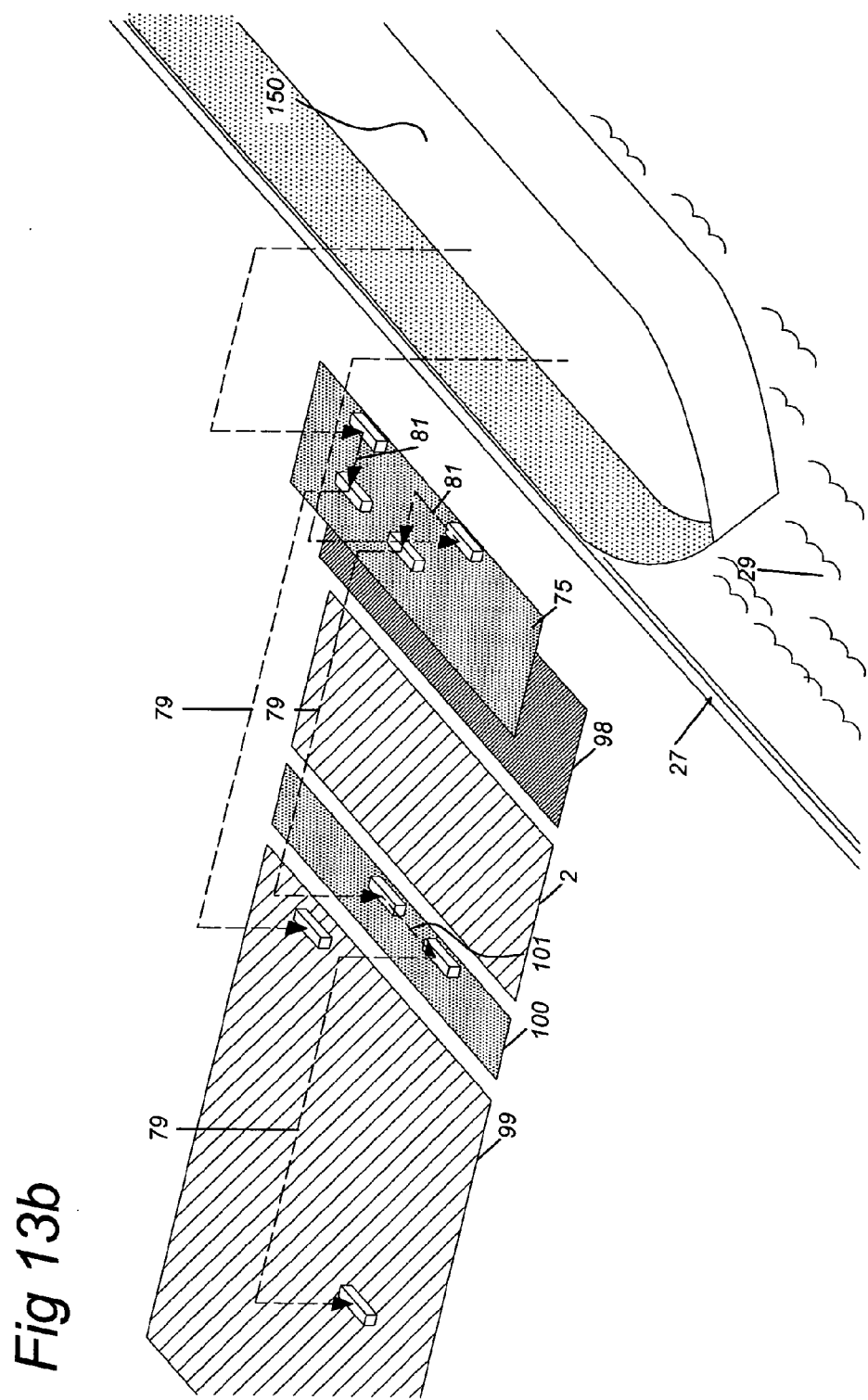
Figure 14:
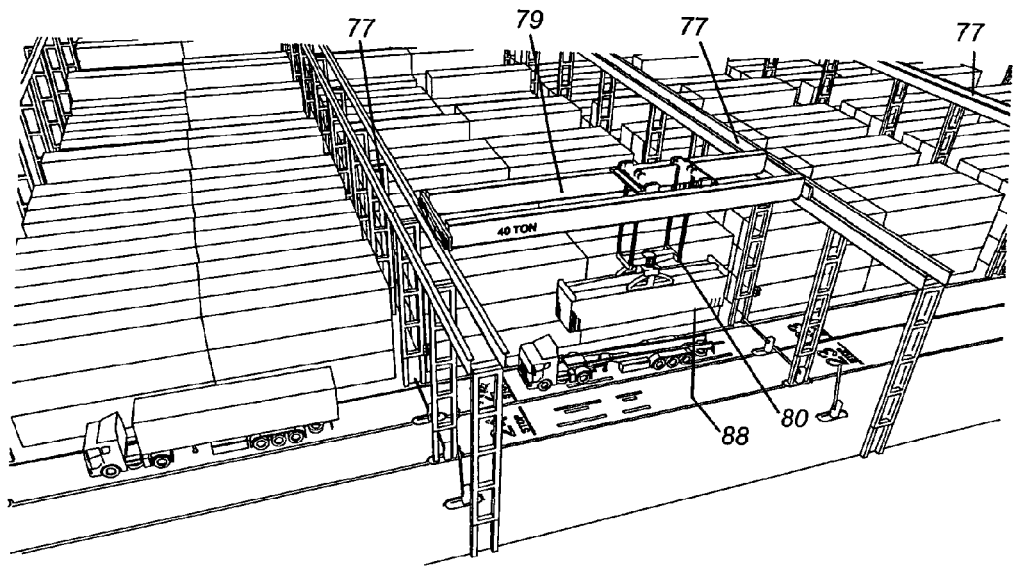
Figure 15:
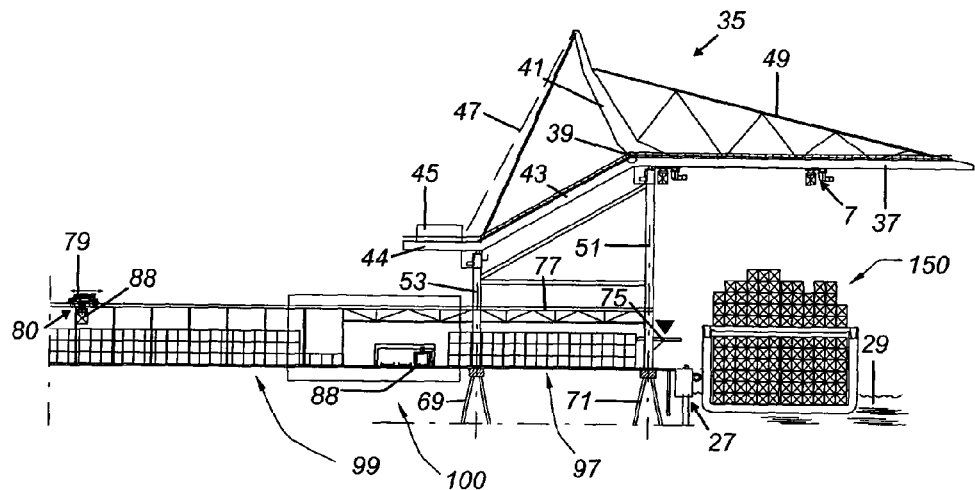
Figure 16:
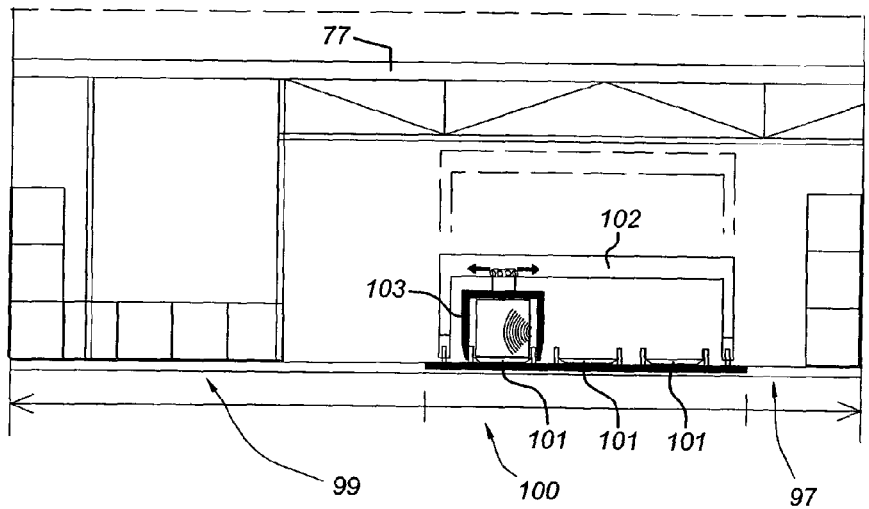
Figure 17:
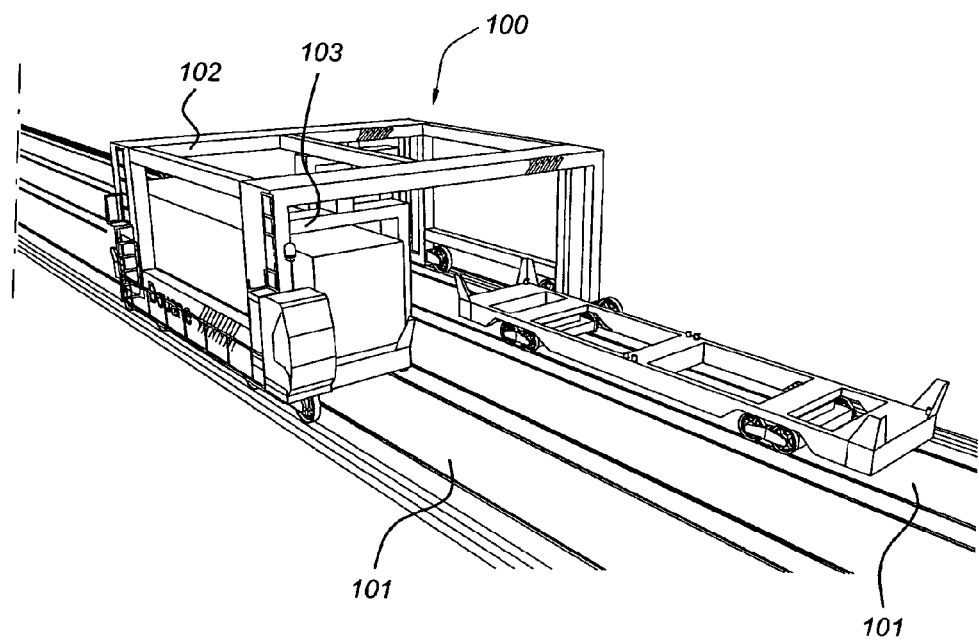

FIGS. 6*a*-*d* show diagrammatic illustrations of an unloading and loading crane arrangement according to an aspect of the invention;

FIGS. 7*a*-*b* show a diagrammatic illustration of an unloading and loading crane arrangement according to an aspect of the invention;

FIGS. 8*a*-*d* show diagrammatic illustrations of an unloading and loading crane arrangement according to an aspect of the invention;

FIGS. 9*a*-*e* diagrammatically show a transport platform and conveyor track for an unloading and loading crane arrangement according to an aspect of the invention;

FIGS. 10*a*-*b* show a top view of a conveyor track and a conveyor floor;

FIGS. 11*a*-*b* show a view in perspective of a conveyor floor in different embodiments;

FIG. 12 shows a top view of a known unloading and loading crane arrangement and a stack area;

FIG. 13*a* shows a top view of an unloading and loading crane arrangement and an integrated stack area in the STS area according to an aspect of the invention;

FIG. 13*b* diagrammatically shows the loading and unloading process;

FIG. 13*c*-*d* shows the simultaneous loading and unloading process in top view on the conveyor floor in an embodiment of the conveyor floor comprising three tracks on the outer side of the row of columns 51 and four tracks on the inside;

FIG. 14 shows an overview of an installation by means of which containers can be loaded onto lorries or goods carriages;

FIG. 15 shows a side view of an unloading and loading crane arrangement with the integration of stack area and STS area according to an aspect of the invention;

FIG. 16 shows a side view of a scanning device;

FIG. 17 shows a view in perspective of a scanning device.

Figure 18A:
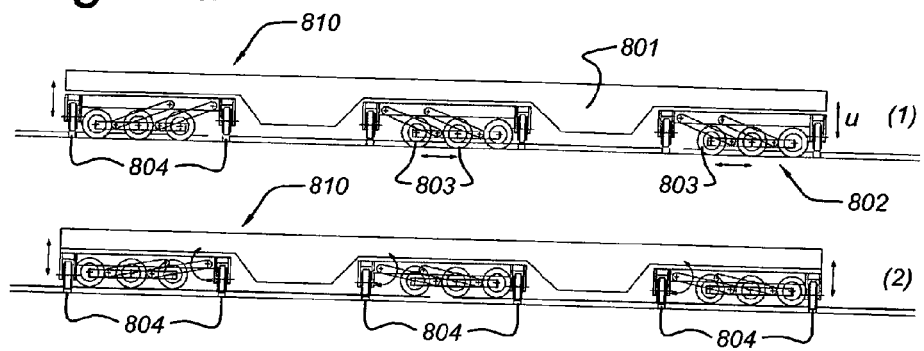
Figure 18B:
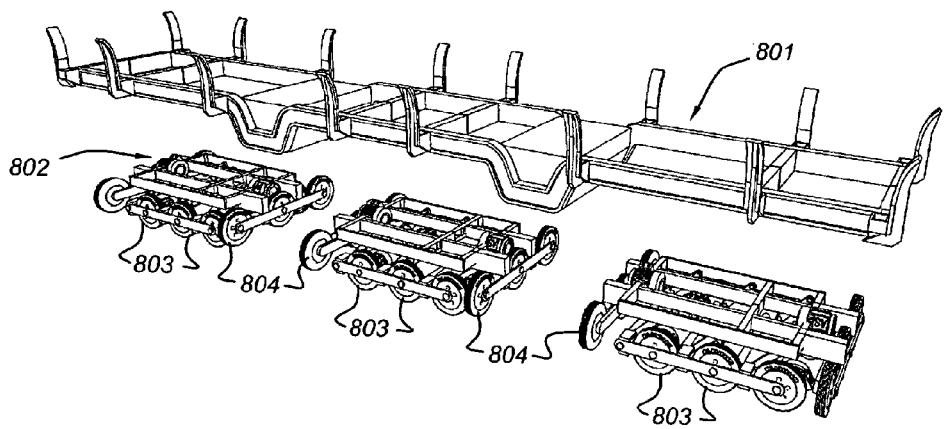
Figure 18C:
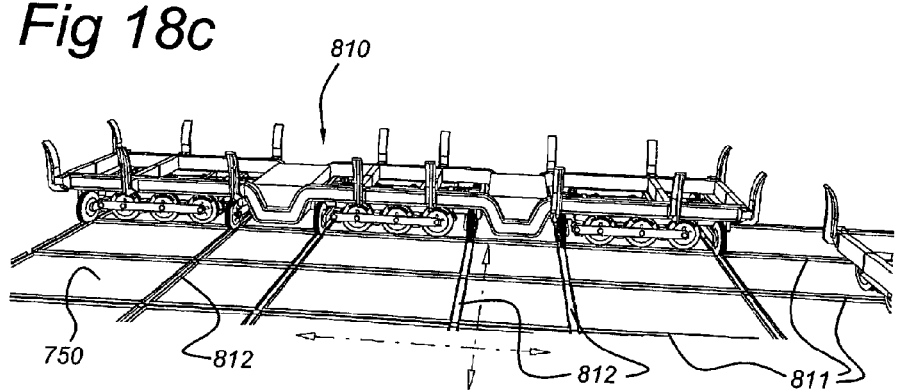

FIGS. 18*a*-*c* show a vehicle for use on a conveyor floor according the invention.

Figure 1:
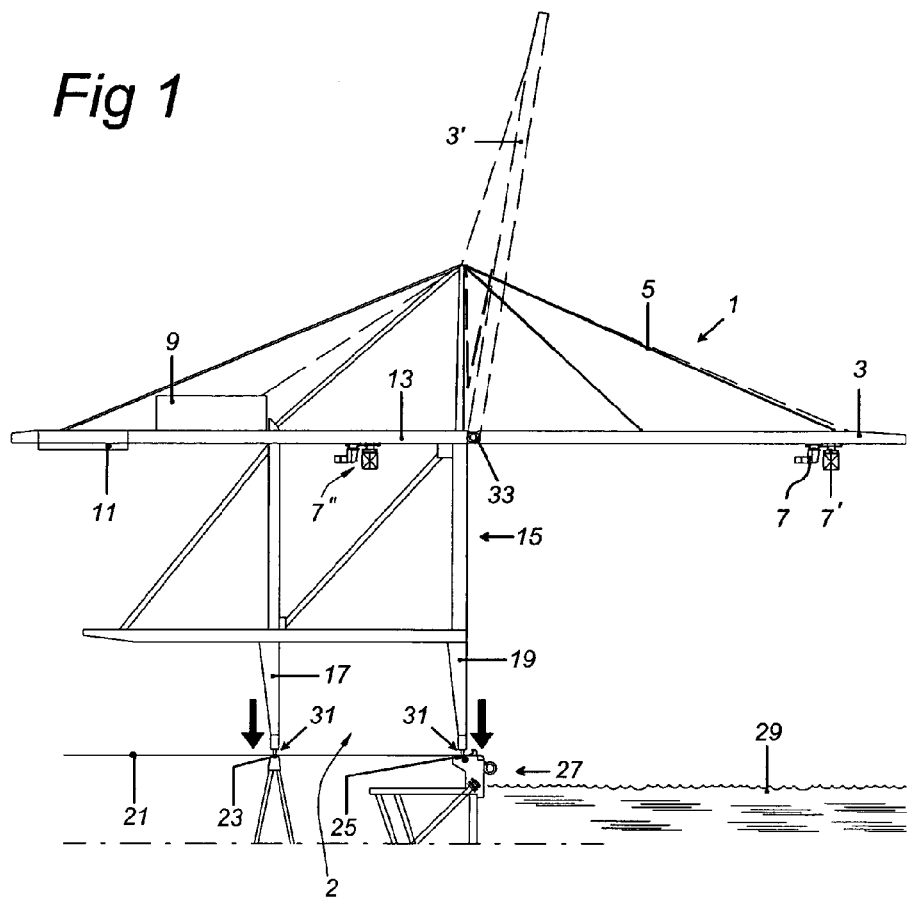

In the figures, identical reference numerals refer to the same parts. FIG. 1 has already been discussed in the introduction.

Figure 2A:
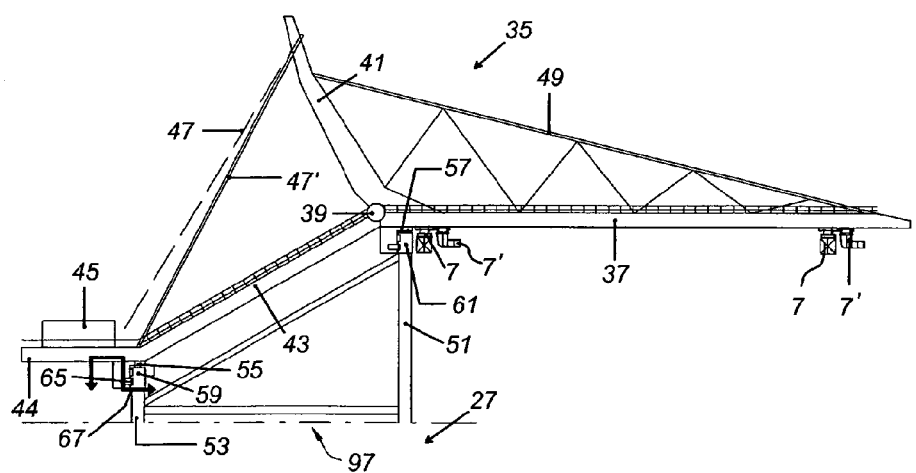

FIGS. 2*a*-2*p* show diagrammatic illustrations of an unloading and loading crane arrangement 35 according to several aspects of the invention. This arrangement 35 has a boom 37 on the underside of which hoist 7 is arranged so as to be movable. Hoist 7 has the same function and can carry out substantially the same movements as in FIG. 1. In use, the boom 37 extends over water, so that a ship 150 with cargo can pass under it.

Figure 2B:
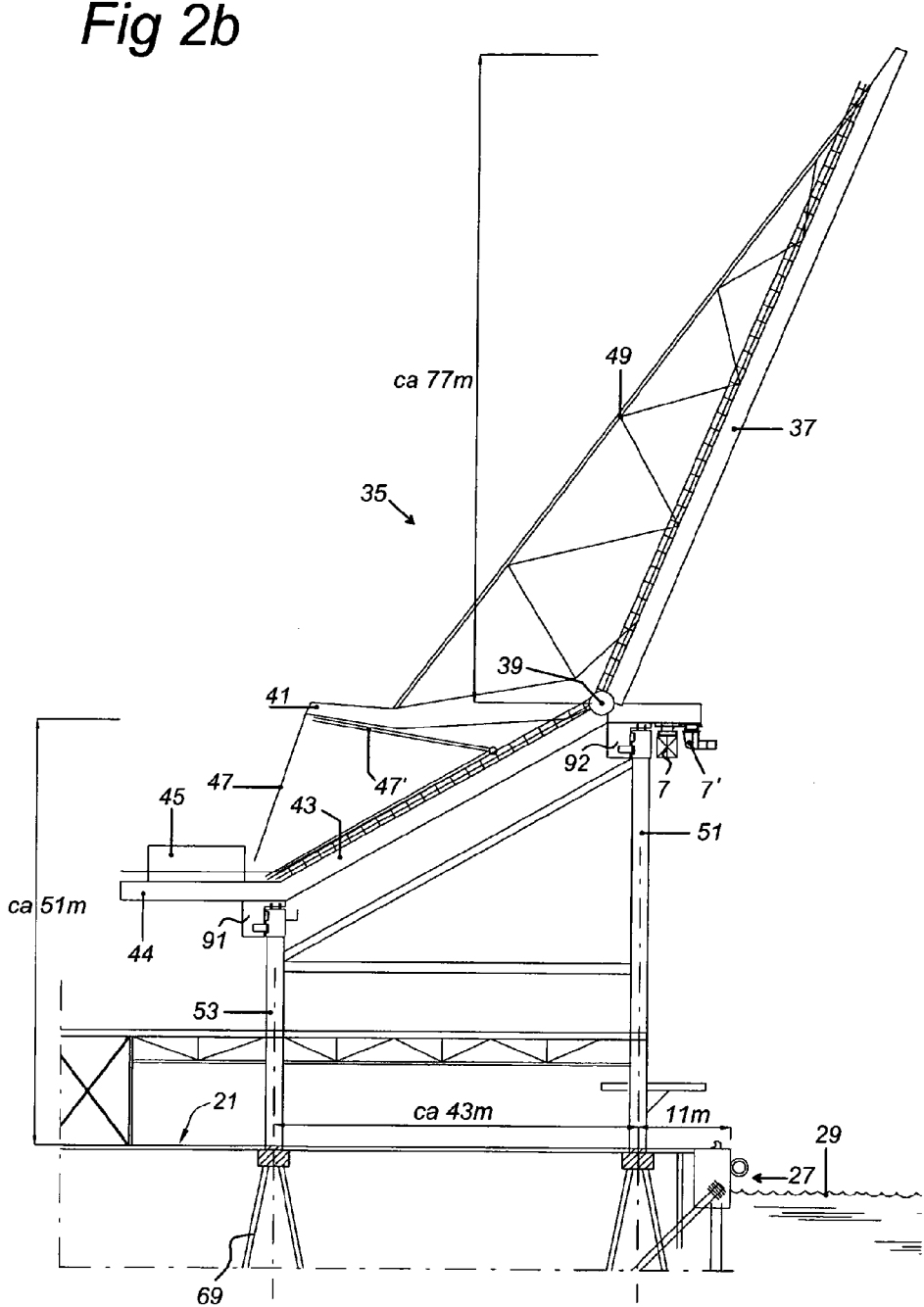

The dimensions as indicated in FIG. 2*b* only serve as an indication for a certain size of the installation. With a larger or smaller projection of boom 37, the indicated dimensions may become larger or smaller.

On the landside, the boom 37 is fixedly connected to a slightly upright arm 41. In order to provide strength, one or more, for example steel, securing parts 49 are fitted between upright arm 41 and various points on the boom 37. Preferably, the securing parts 49 are fitted together as a framework structure, more preferably as a three-dimensional framework structure. The upright arm 41 is thus connected to the boom 37 in a substantially rigid way. In any case, the connection between arm 41 and boom 37 is such that when the arm 41, from the position illustrated in FIG. 2*a*, is tilted around the hinge point 39 in the direction of the land, the boom 37 tilts along in such a manner that a distal end of the boom 37 moves away from the water surface. Above land, the arrangement 35 is provided with an arm 43 which, in the drawing, is fitted at an acute angle to the horizontal plane (or the boom 37, if this is in the lowered position). On the rear side, the arm 43 has a, for example horizontal, platform 44 on which a counterweight can be placed. Preferably, the counterweight is omitted by configuring the structure of arm 43, arm 41 and boom 37 in such a manner in terms of weight distribution that together they ensure that the arrangement is sufficiently balanced, both in the position when the hoist 7 has gripped a load and in the position when the hoist 7 has not gripped a load. A machine housing 45 is placed on platform 44. The machines in housing 45 are used to tilt the boom 37 about hinge point 39 by means of cables 47 and draw bar 47'.

The boom 37, together with the upright arm 41 and the other bars of the framework structure 49, form one dimensionally stable projecting beam with a triangular cross section.

This makes it possible to choose the dimensions of the boom in such a manner that projections of 100 meters or more are possible without causing any problems.

In FIG. 2*b*, with a distance of column 51 to the quay 27 of ±30 meters, this still makes it possible to achieve a sufficiently large outreach to be able to load and unload the widest ships. A working space between the quay 27 and the waterside columns 51 of the fixed structure of ±30 meters makes it possible to carry out virtually all longitudinal container displacements for the purpose of loading and unloading on the outer side of the fixed structure while also allowing sufficient space for stacking the hatch covers.

Figure 2C:
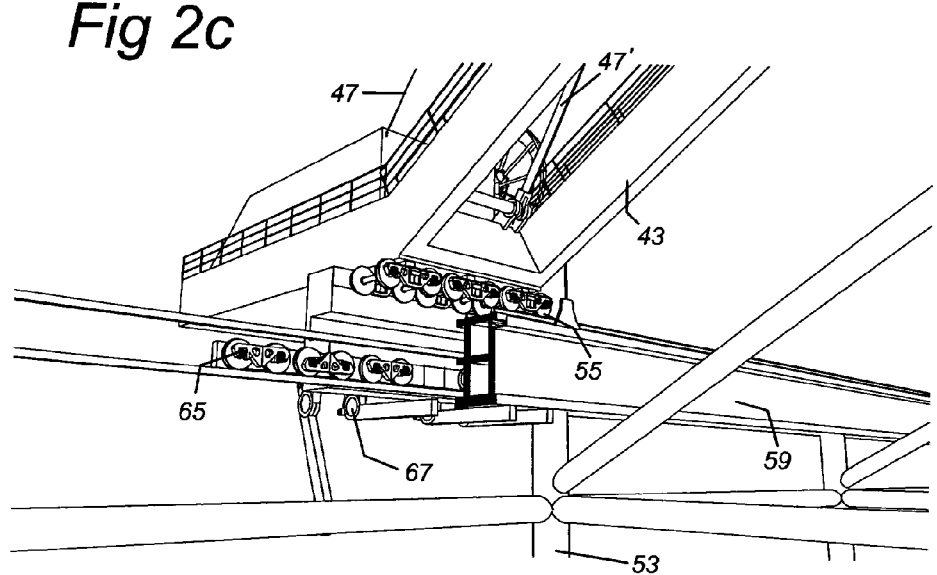
Figure 2D:
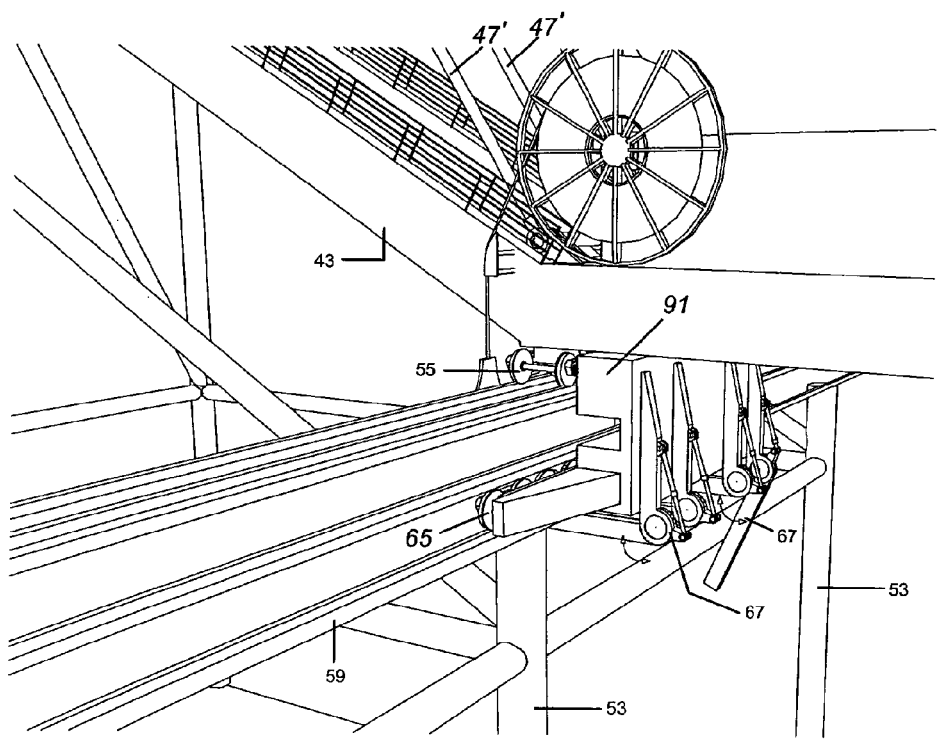
Figure 2E:
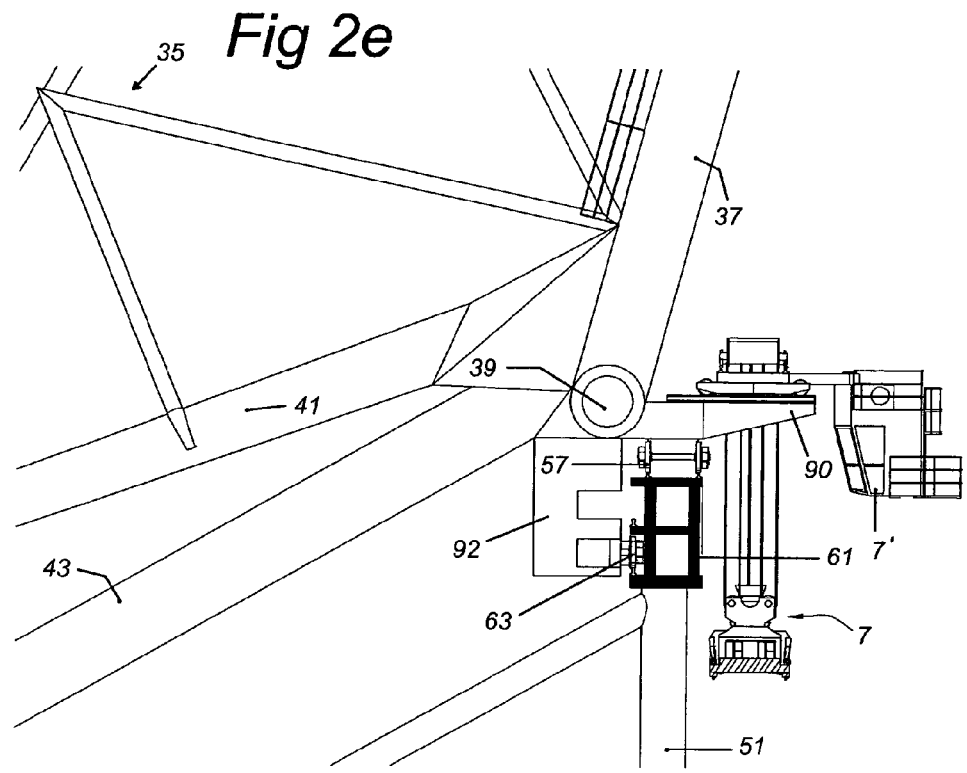
Figure 2F:
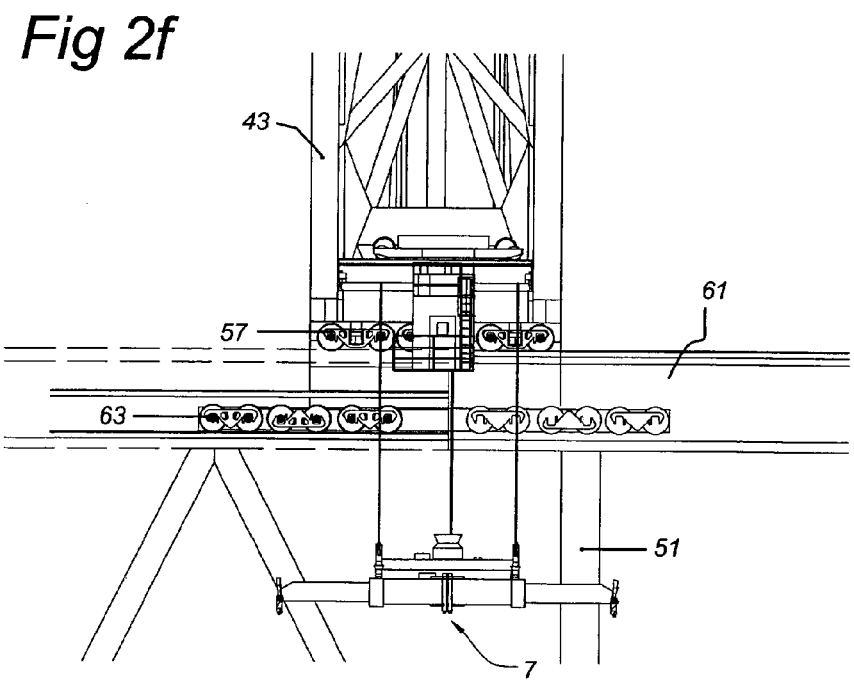
Figure 2G:
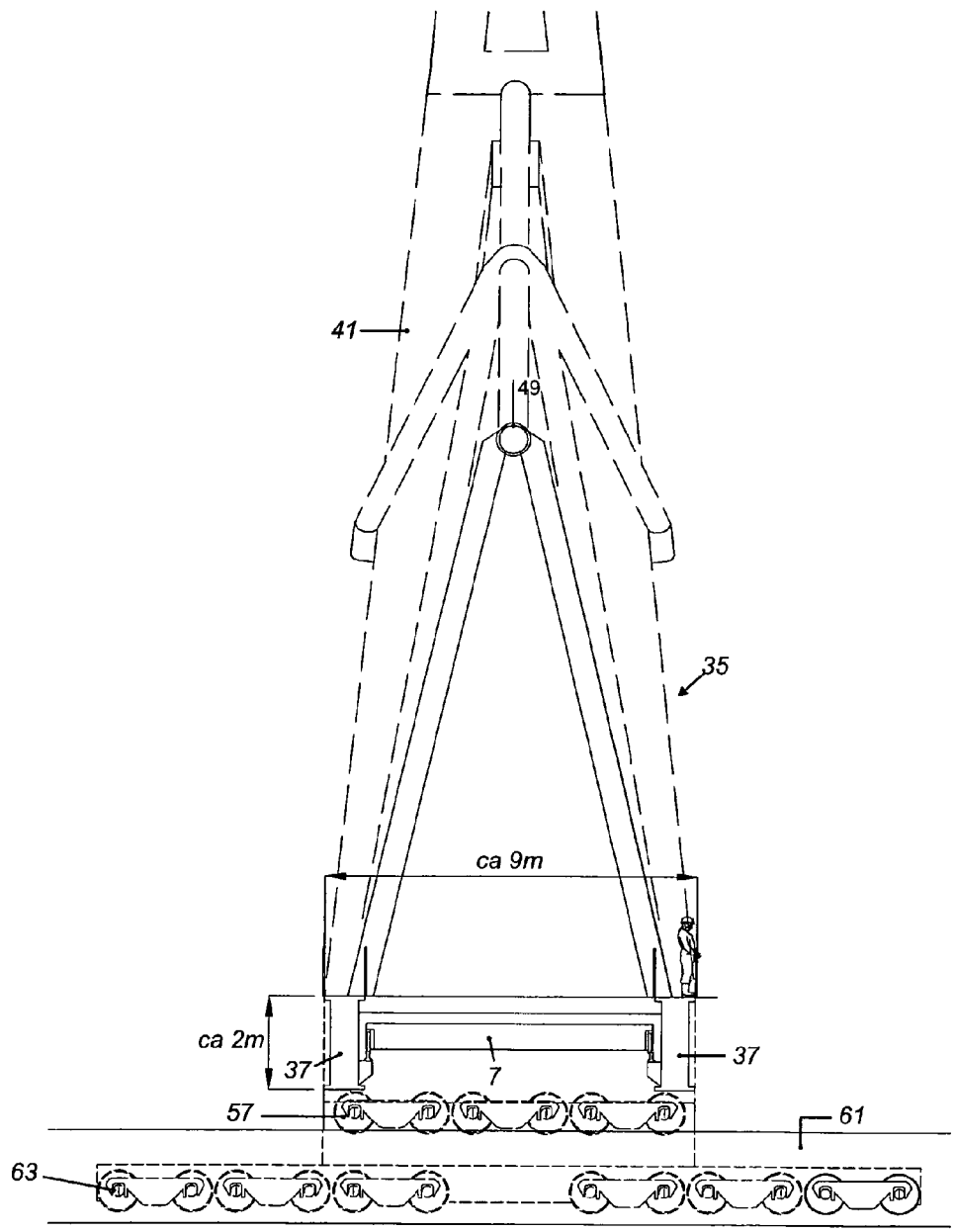

FIG. 2*g* shows a view in the transverse direction (i.e. at right angles to a line along the quay) of the projecting part 37, 49 onto the waterside rail beam 61. This dimensionally stable projecting structure can be rotated upwards from the horizontal position about hinge point 39 approximately as far as the vertical position or at least such that the end is sufficiently far from the side of the ship 150 (see FIG. 2*b*). In known cranes, a substantially two-dimensional extending arm is often used (see, for example, FIG. 1 and FIG. 4). Such a two-dimensional arm has to be made extra strong in order to achieve the required rigidity. Using a framework structure as illustrated in FIGS. 2*a*-2*o* makes it possible to make the crane module much lighter, which results in a direct saving in material as well as an indirect energy saving with regard to the displacement in the longitudinal direction of the quay. It is also possible to achieve a saving during assembly in situ in an advantageous manner as a result of the fact that lighter materials are being used.

In addition, the framework structure is preferably three-dimensionally stable, as a result of which the risk of damage as a result of a heavy storm or hurricane can be reduced significantly. In areas where earthquakes, typhoons and the like have to be taken into account in the design, the illustrated framework structure offers sufficient possibilities to limit the risks to a minimum.

The fixed framework structure which connects arm 37 and arm 41 via structure 49 preferably does not use cables and winches. Thus, wear on cables and winches in this part of the crane will not occur and, in an advantageous manner, less maintenance will be required than with a known structure, such as for example illustrated in FIG. 1. Due to the rigid framework structure of the boom 37, 41, 49, the crane module 35 is, for example, better able to withstand heavy storms and hurricanes than a known projecting boom which is anchored by cables and winches.

The landside arm 43 of the crane module 35 effectively forms the base of the crane module. Both on the underside 55 (that is to say, on the side of platform 44, see also FIGS. 2c and 2d) and on the upper side 57 (that is to say on the side of hinge point 39, see also FIGS. 2e and 2f), the arm 43 has a wheel set 55 and 57, respectively, by means of which the entire crane module can be displaced in the longitudinal direction (substantially parallel to the quay) along the raised waterside guide or rail beam 61 and along the lowered landside guide or rail beam 55. The upper part 37, 41, 49 is attached to the landside arm 43 which forms the base by means of the hinge 39 and the draw bar 47'.

In the embodiment from FIG. 2a, the landside rail beam 59 is situated approximately 15 to 25 meters lower than the waterside rail beam 61. This results in a significant saving in the required structure material compared to the prior art, as is, for example, illustrated in FIG. 1. An additional advantage is that the centre of gravity 73 (see FIG. 7) of the entire crane module 35 comes to lie significantly lower than is known from the prior art, which has an advantageous effect on the stability and the susceptibility to wind of the module 35. The centre of gravity of the entire crane module 35, in particular of the entire assembly consisting of 37, 49, 41, 43, 44, 45, 47, is approximately 10 to 15 meters below the waterside rail beam 61. The centre of gravity of the entire crane module 35 is thus, for example, at a height between the heights of the landside 59 rail beams and the waterside 61 rail beams.

The two parts of the crane module 35, the upper part 37, 41, 49 and the lower part 43 can be prefabricated and transported separately, which results in a significant simplification compared to known methods of production and transportation.

The assembly consisting of boom 37, structure 49 and upright arm 41 is connected to arm 43 via a hinge 39. This is done in such a manner that the boom 37 together with the arm 41 can tilt in such a manner that the boom 37 can be taken to an upright position, so that ships can moor underneath the boom 37 without hitting it. The hinge point 39 is situated on the landside near the fixed supporting structures 61 and 51. When transporting containers from or to the ship, all loads on the boom 37, 49, 41 are transferred to the rail 61 by means of the wheels 57 via the arm 43. The hinge 39 is thus only subjected to little, if any load. To this end, the wheels 57 are provided with a "mounting" structure or "cam" structure.

Cables 47 are provided substantially parallel to the draw bar 47', between the arm 41 of the upper part and the underside of arm 43. The cables 47 are operational when the upper part 37, 41, 49 of the crane module is pulled up or lowered. As soon as the boom 37 is in a horizontal position, the fixed draw bar 47' assumes the tensile force, which also reduces the wear on cables 47 and winches. Preferably, the cables 47 and the draw bar 47' serve as a backup facility in case an emergency occurs in one of the two.

On the upper side of arm 43, a "parking platform" 90 (see FIG. 2e) is attached to the end side of the gripper 7 and the cab 7' of the crane operator. The gripper 7 and cab 7' can thus be parked on the parking platform 90 separately from the upper part 37, 39, 41 when the upper part is or has been lifted up.

FIG. 2/shows how, in the upright position, the upper part 37, 41, 49 can be readily anchored in a storm-proof way on the waterside rail beam 61 in case a heavy storm or hurricane is to be expected. On the upper side of the columns 51, a cable 46 is present on a winch 44. The end of cable 46 is attached to a displaceable and preferably remote-controllable anchorage 48 which is displaceably arranged on the side or on the underside of the boom 37. After the anchorage 48 has been moved upwards, the cable 46 is made storm-proof by means of the winch 44. A problem of known crane modules is the fact that they can collapse in stormy weather conditions. The storm-proof anchorage of the upper part 37, 41, 49, in an advantageous way, makes the crane module stronger, especially since the anchorage preferably engages with rail beam 61 at the location of the hinge point and with a range of, for example, ±60 meters. With known STS cranes, the anchorage point, if applicable, is at quay level, i.e. approximately 50 meters below the hinge point and with a range of, for example, ±27 meters.

The arrangement 35 has a first series of fixed mechanical legs or columns 51 on the waterside of the quay 27 and a second series of fixed mechanical legs or columns 53 on the landside of the quay 27. These first and second series of fixed mechanical columns 51, 53 are fixedly anchored to the ground and can therefore not be moved along rails 31, as is the case in FIG. 1. The unloading and loading crane arrangement 35 is provided with wheels 55, 57 and support wheels 63, 65, but these are not intended to drive at quay level 27 itself. The area 97 between the columns 51 and 53 is denoted as the buffer-in area 97 insofar as this area is situated on dry land. Incidentally, the fixed arrangement can equally well be built over an inclined slope 29'', as is illustrated in FIG. 2m, or completely over the water surface, as is illustrated in FIGS. 2n and 2o, with the columns 51, 53 being placed in the bed 29'. In these cases, quay 27 also refers to a mooring facility 27', for example a fender wall or a number of mooring posts or dolphins which are spaced apart slightly.

Figure 3A:
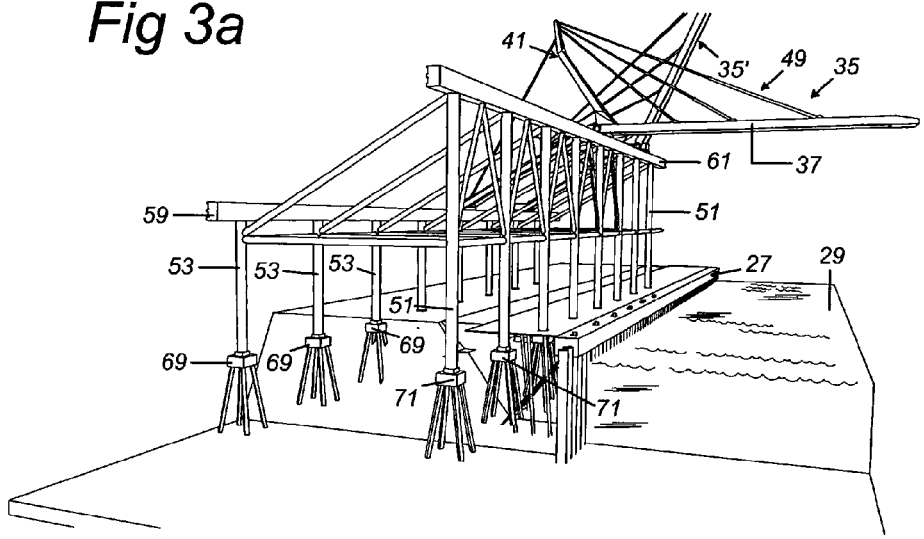

On the upper side, the first series of columns 51 is provided with a first guide or rail 61 which extends in the direction of the quay 27 (see for example FIG. 3a). Said guide 61 is configured such that the wheels 57 can drive on this guide 61 in a direction parallel to the quay 27. In a similar manner, the upper side of the second series of columns 53 is provided with a second guide 59 which extends in the direction of the quay 27. Said guide 59 is configured such that the wheels 55 can drive on this guide 61 in a direction parallel to the quay 27 or mooring structure 27'.

The combination is configured in such a manner that the boom 37 can swing upwards, while the wheels 57 still remain on the guide 61. The arrangement 35 comprises one or more running wheels 63 which can rotate horizontally in a notch in the guide 61. Thus, the arrangement 35 also has one or more running wheels 65 which can rotate horizontally in a notch in the guide 59. Thus, the guide/wheel connection is, in an advantageous manner, configured to absorb tensile forces to a large degree, in particular forces which could make the crane module tilt. Running wheels 63 may be provided in a groove on the landside of guide 61 or the waterside of guide 61. Running wheels 65 may be provided in a groove on the landside of guide 59 or the waterside of guide 59. Reference numeral 67 (FIG. 2h), for example in the shape of a hook, indicates a mechanical anchorage of the arrangement 35 to the rail structure on the landside.

Figure 2H:
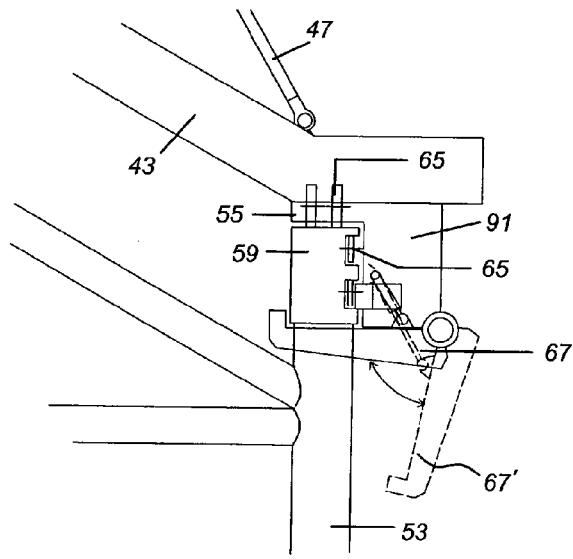
Figure 2I:
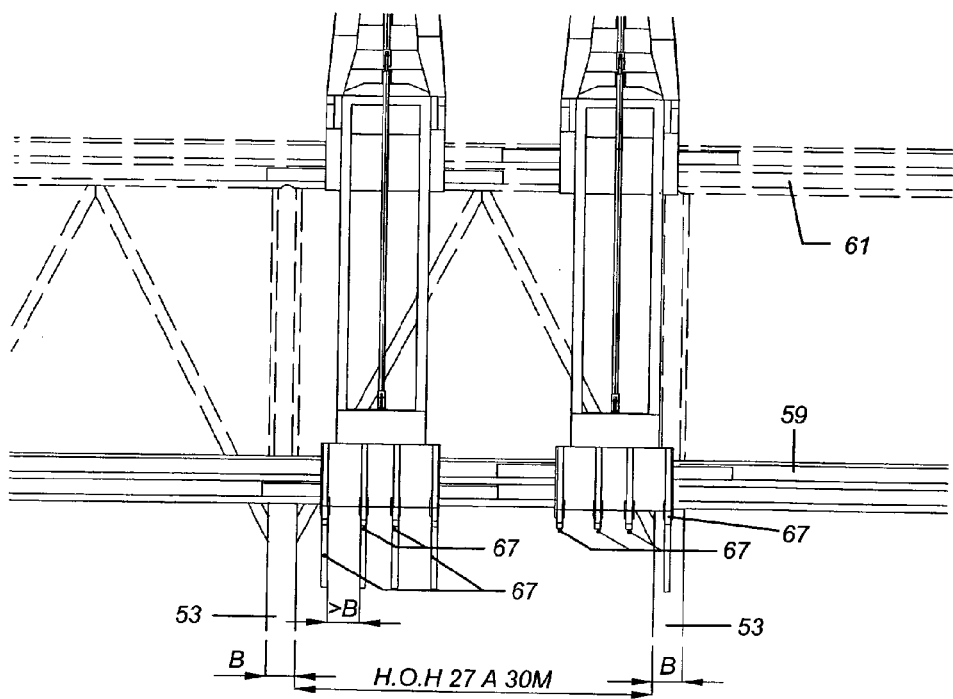

FIG. 2h shows a detail of the arrangement of the arm 43 with wheels 55 on the landside rail beam 59. Securing part 91 is formed in such a manner that when the crane module 35 is placed on the rail beam 59, wheels 55 come into contact with an upper surface of the rail beam 59, and support wheels 65 run in a groove in the rail beam 59. Partial hook 67 which can be opened forms an additional anchorage in case very heavy loads have to be lifted.

By means of the anchorage 67 of the part 43 on the landside rail beam 59 (see also FIG. 2i), little, if any ballast weight is required in the crane module 35. This anchorage 67 is used during loading and unloading of the containers. The resulting tensile forces are transmitted by this anchorage 67 to the fixed structure and transmitted to the foundation 69 via the columns 53 (see also FIG. 3a).

Figure 2J:
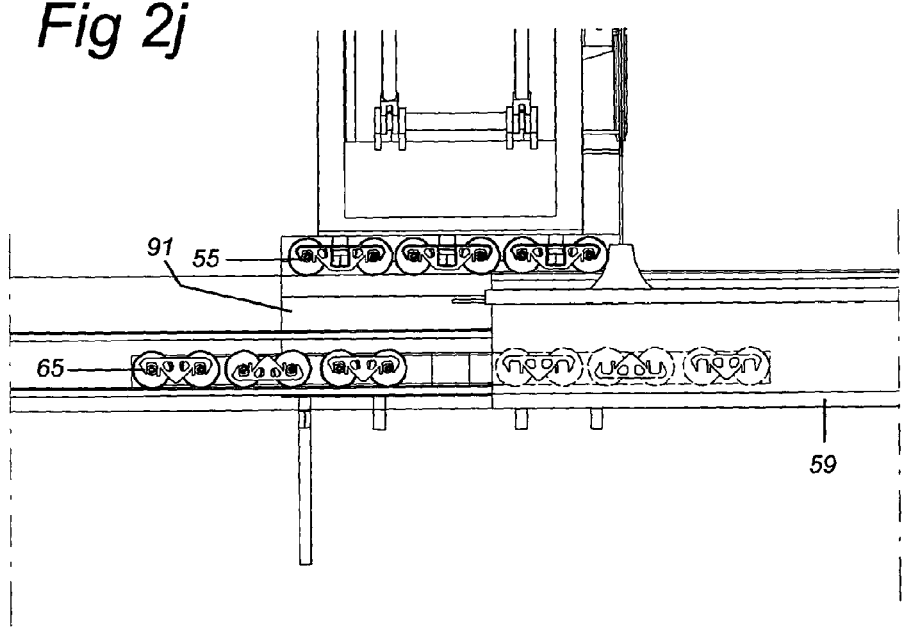
Figure 2K:
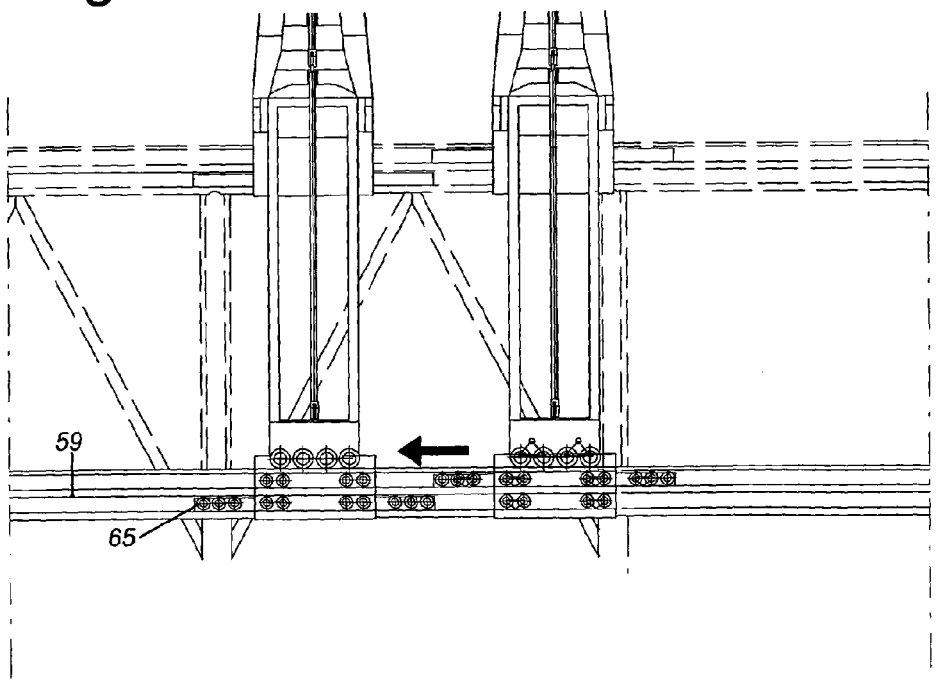
Figure 2L:
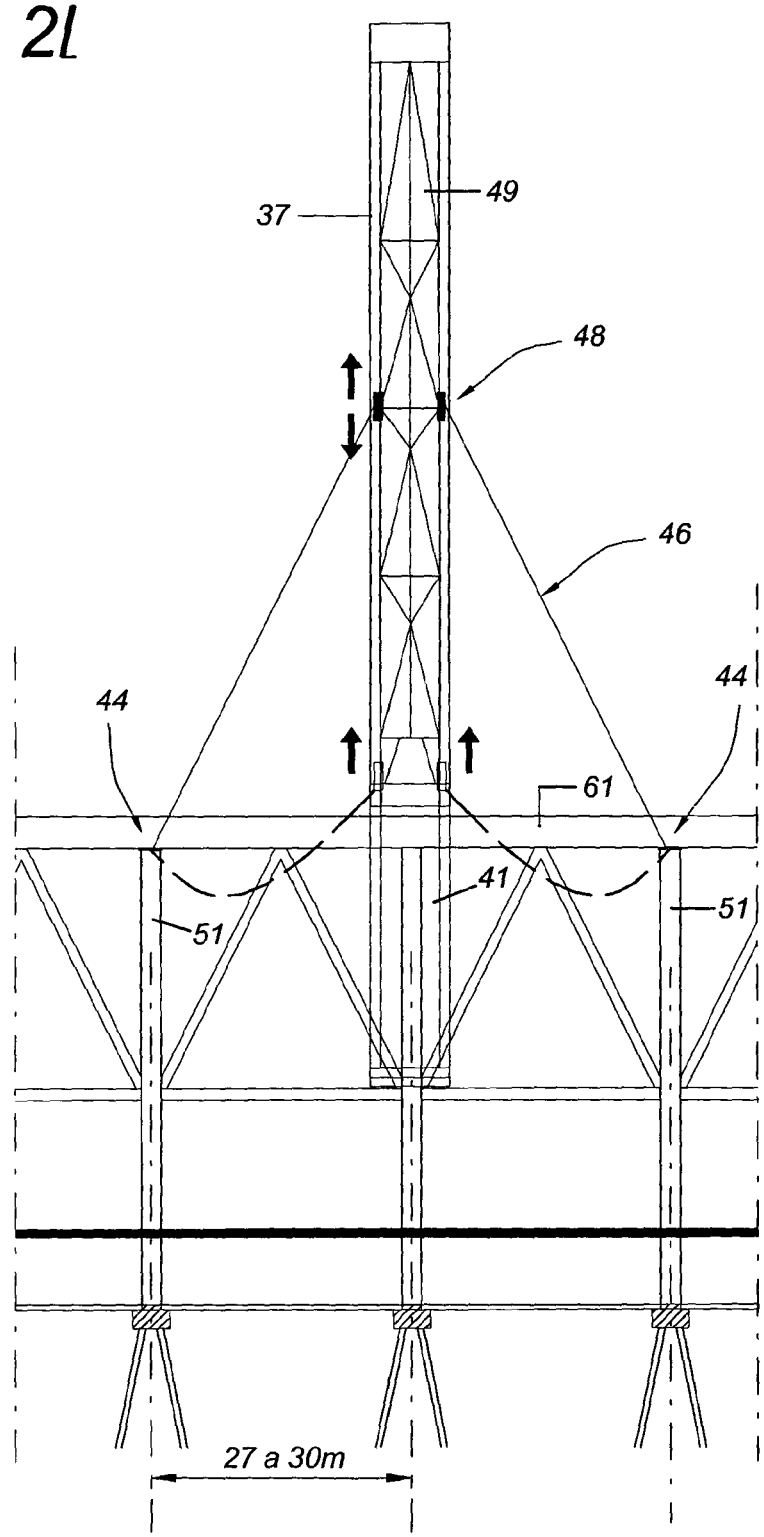
Figure 2N:
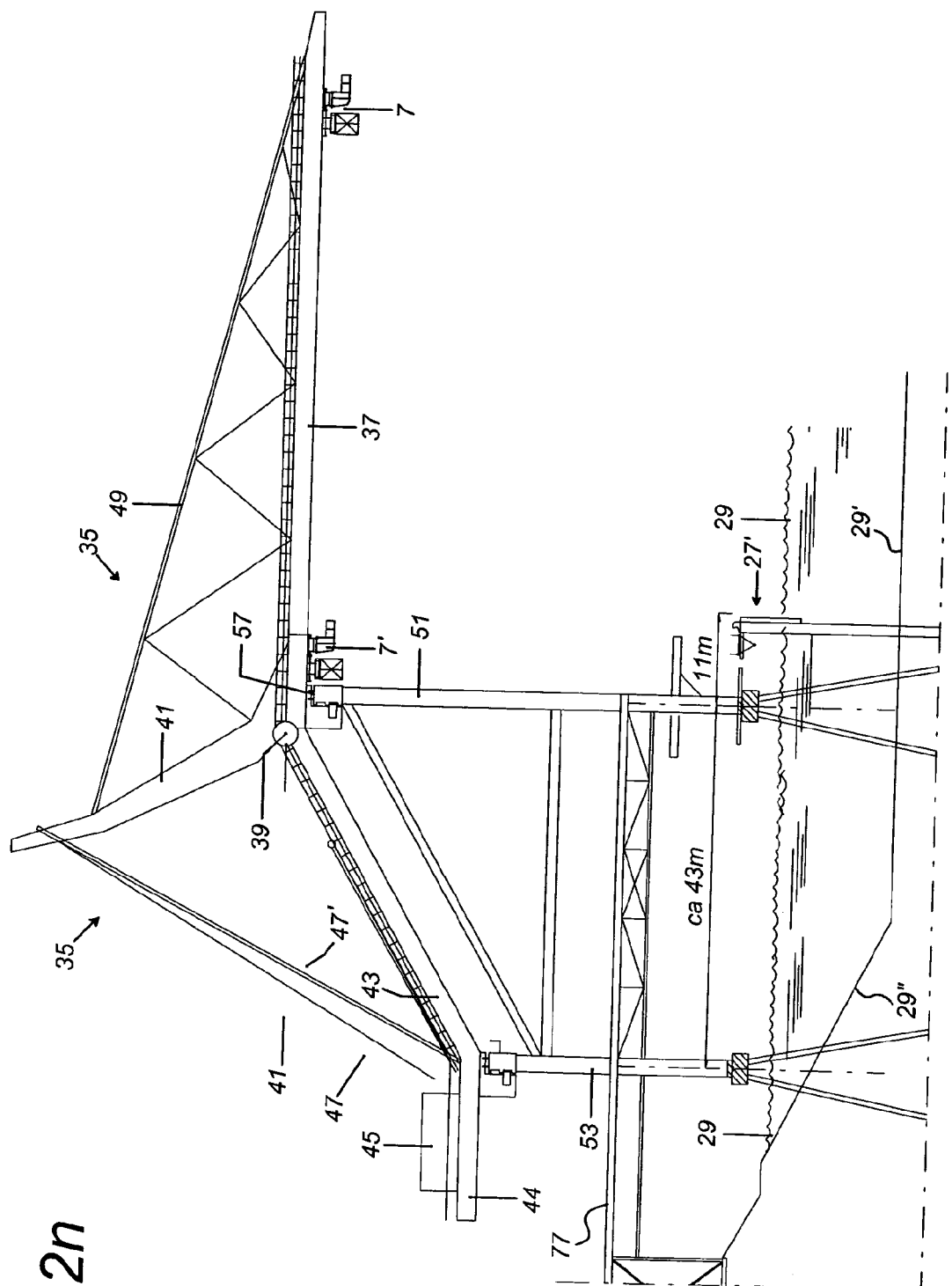
Figure 2O:
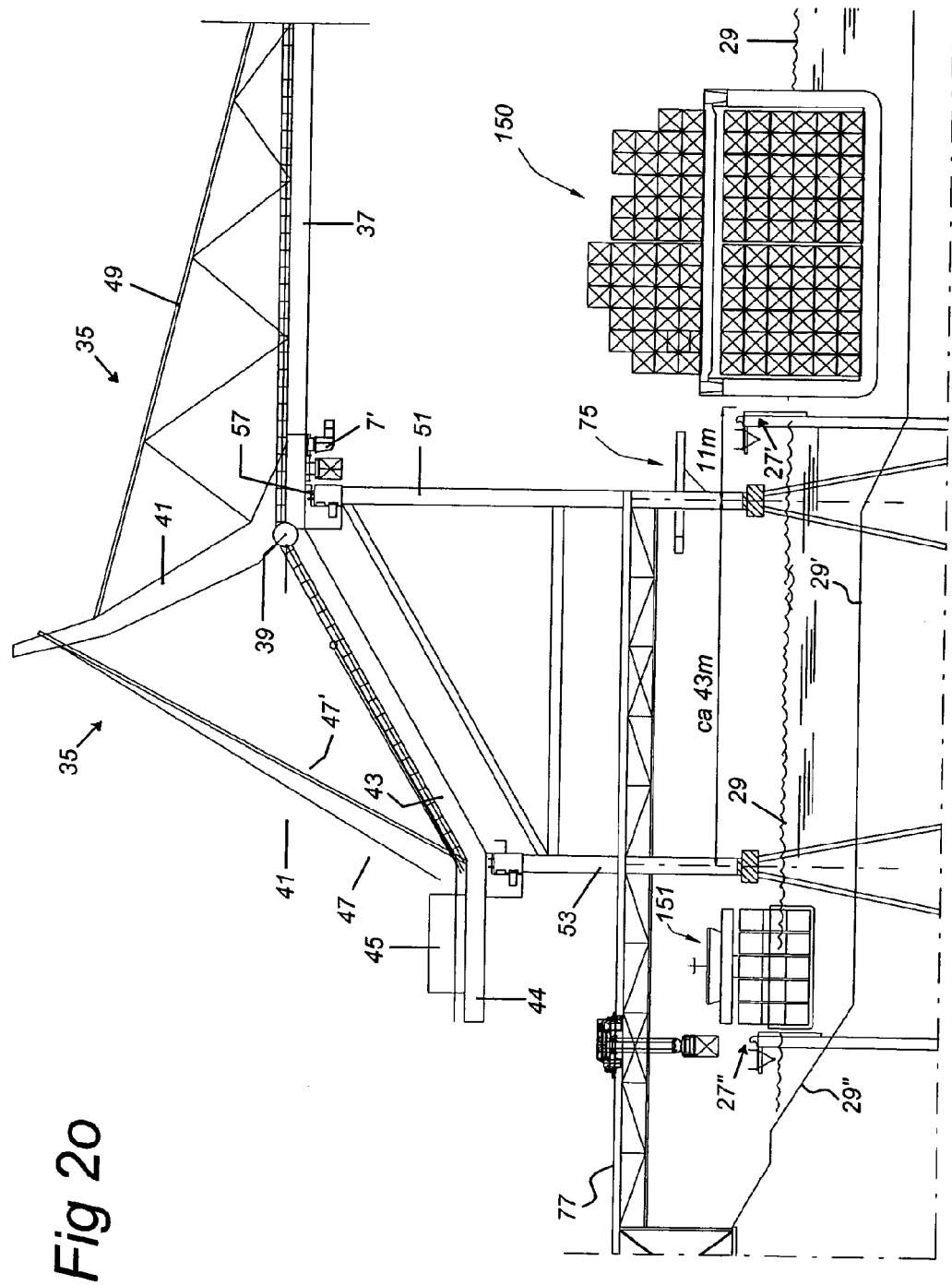

While the crane module is driving in the longitudinal direction, parallel to the quay, and when stationary while lifting less heavy loads, any tensile forces resulting from wind loads and brake forces are transmitted to the landside rail beam 59 by the support wheels 65 (see FIGS. 2j and 2k). With this combination of loads, the anchorage 67 is not required.

On the waterside, at rail beam 61, the crane module 35 is also provided with a securing part 92 which cooperates with the rail beam 61 in a similar way by means of wheels 57 and support wheels 63.

FIG. 2m shows a variant in which the column or series of columns 51 is placed in the bed 29'. The term bed 29' is generally also understood to refer to the slope 29" which is situated above or below water and may or may not be reinforced. In FIG. 2m, no quay wall is therefore provided, but, viewed from the landside in the direction of the waterside, the quay surface 21 ends at a certain point, beyond which a reinforced or non-reinforced slope continues as far as the waterside. This variant makes it possible, in an advantageous way, to provide an unloading and loading crane arrangement 35 without a reinforced quay 27. Preferably, a mooring facility 27' is provided, so that ships cannot come too close to the landside.

FIG. 2n shows a variant in which both series of columns 51 and 53 have been placed in the bed 29' or slope 29".

FIG. 2o shows a variant in which a second mooring facility 27" has been provided on the landside of the first mooring facility 27', as a result of which a river vessel can moor between the mooring facility 27' and the series of columns 53. Obviously, it is also possible to construct a second mooring facility between series 51 and 53. In the variant from FIG. 2o, the device 35 therefore also functions as a ship-to-ship unloading and loading crane arrangement. Cargo from a container ship 150 can be gripped by gripper 7 and taken to a river vessel 151 via conveyor floor 75 and transverse conveyor track 77.

Although FIGS. 2a-2p show an arrangement 35 in which the arm 43 is at an angle with respect to the boom 37, this is not strictly necessary for aspects of the invention, such as for example the use of the framework structure or the foundation of the columns 51, 53 in a quay and/or in a bed. Columns 53 may be of equal length to columns 51, and rails 59, 61 may be situated at substantially the same height.

The embodiments described in connection with FIGS. 2a-2p can, in an advantageous manner, be produced with less material than known crane modules. For example, the cross sections of both rail beams 59 and 61 may, in certain embodiments, have a height of at most 2 meters, preferably at most 1.5 meters, and a width of approximately at most 2 meters, preferably at most 1.5 meters, as a result of which a significant saving in material is achieved. The rail beams may have a box profile.

The term unloading and loading crane arrangement may, depending on the context, be used to refer to a single unloading and loading crane module or to an assembly of, for example, series of columns 51, 53, guides 59, 61, and one or more loading crane modules which are displaceable on said guides.

Figure 3B:
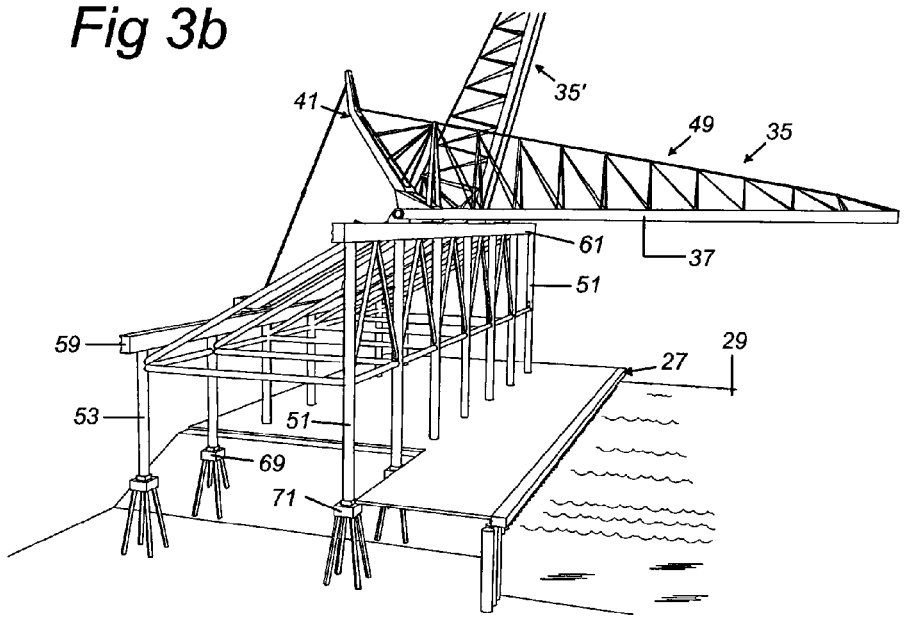
Figure 6A:
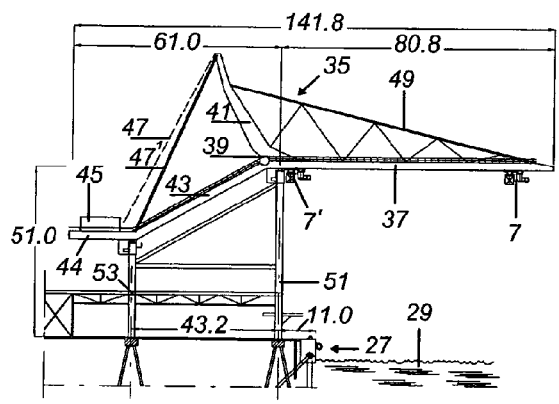
Figure 6B:
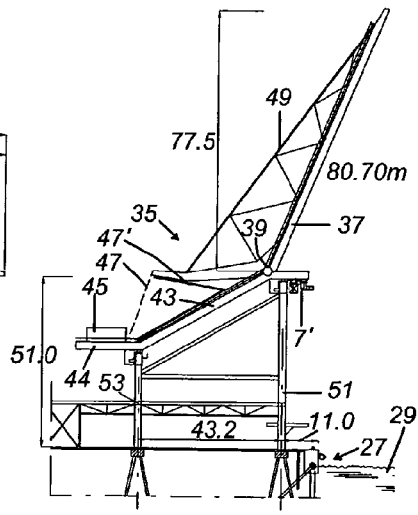
Figure 6C:
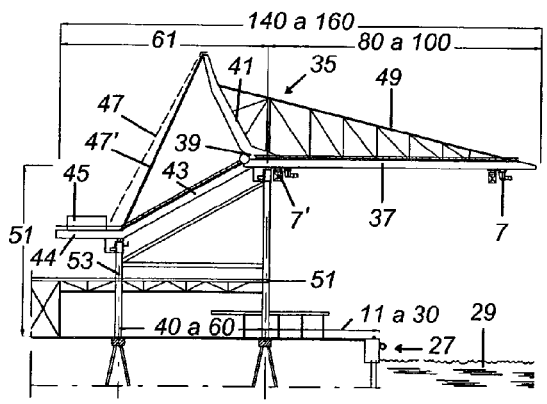
Figure 6D:
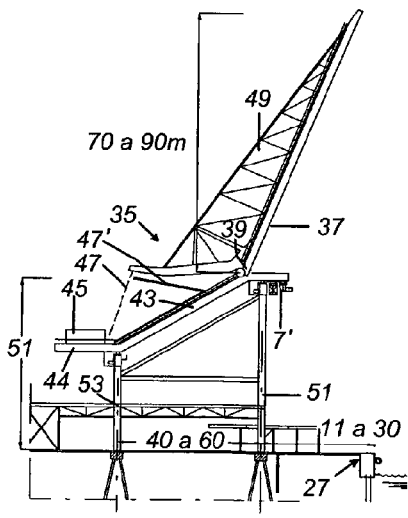

While FIGS. 2a-2p show different views of the unloading and loading crane arrangement according to aspects of the invention, FIGS. 3a and 3b show a diagrammatic illustration in perspective with a relatively small projection and with a relatively large projection of the boom, respectively. Several columns 53 of the first series of columns can clearly be seen, as well as several columns 51 of the second series of columns. In addition, FIG. 3a shows that each of the first series of columns 53 is anchored securely in the ground (quay 27 or bed) by means of respective foundation means 69 and each of the second series of columns 51 is anchored securely by means of respective foundation means 71. Finally, FIG. 3a shows that the complete structure may comprise two or more adjacent movable crane modules of unloading and loading crane arrangements 35, 35" which can all drive on the same guides 59, 61. Each of such crane modules comprises a boom 37, an arm 41 and an arm 43, as well as all the described parts which can be driven on the guides 59, 61 by means thereof.

The structures illustrated in FIGS. 2a-2p and 3a-b inter alia have the following advantages. Use of ballast, for example as counterweight 29 in FIG. 1, is not required in the structures illustrated in FIGS. 2a-2o and 3a-b, or hardly at all, which results in a saving in material. Any tensile forces on the guides 59, 61 are transmitted to the ground via the series of columns 51, 53 and foundation means 69, 71. The unloading and loading crane arrangement 35 according to an aspect of the invention can be displaced with relatively little energy. In addition, the displacement takes place at a distance above the quay surface 21 (if present), as a result of which the traffic safety on the quay surface 21 is improved. Finally, due to the use of raised guides, it is no longer necessary to keep rail grooves in the quay surface clean.

According to an aspect of the invention, the structural demands on the quay, in particular on the waterside, are reduced in an advantageous manner. As FIG. 3a already indicates, the total structure may be configured in such a manner that each column 51 can have its own foundation means 71. There are no longer any rails 25, as was the case in FIG. 1. The loads on the guides 61 exerted by movable parts of the unloading and loading crane arrangement 35 which can drive on guides 61, are transmitted to the fixedly arranged columns 51. The foundation means 71 may be fitted in the ground and, depending on the positioning, not each part of the quay 27 has to be dimensioned on the basis of a maximum load as was the case in FIG. 1 in the case of a continuous quay on dry land. Only the columns 51 have to be able to bear the load. The distance between two adjacent columns 51 is, for example, 27 to 30 m. This makes it possible to construct a container terminal above the water surface without a quay wall.

According to an aspect of the invention, the structural demands on the quay site, in particular on the landside, are further reduced in an advantageous manner. As FIG. 3a indicates further, the overall structure can be configured such that, on the landside, each leg 53 can have its own foundation means 69. There are no longer any rails 23, as was the case in FIG. 1. The loads on the guides 59 can be transmitted to the fixedly arranged columns 53 by movable parts of the unloading and loading crane arrangement 35 which can drive on guides 59. The foundation means 69 may be fitted in the ground.

Only the columns 53 have to be able to withstand the load. The distance between two adjacent columns 53 is, for example, 27 to 30 m.

It is not necessary to provide a rail groove on the quay site with rails 31 fitted therein in order for vehicles to be able to carry out a transverse movement, at right angles to the rails, with respect to the quay 27. In other words, the quay site does not require any obstacles on the landside of the structure.

FIG. 4 shows a top view of a conventional unloading and loading crane arrangement 1. FIG. 4 shows that the boom 3 in the prior art consists of two booms 3a, 3b which run parallel to each other and between which the hoist 7 is situated. If, as in FIG. 4, the booms 3a, 3b are positioned in such a manner that the gripper can reach containers in a bay of a container ship, the parallel booms 3a, 3b block the adjacent bays. These are then not accessible for a possible second unloading and loading crane arrangement 1. This structure therefore makes it impossible to load or unload containers from two adjacent bays simultaneously.

However, in a further aspect of the invention, as is illustrated in FIG. 5, the boom 37 can be configured as a single boom underneath which a hoist 7 which is displaceable in the transverse direction (away from the water 29 and towards the water 29) is provided. In that case, there is only one upright arm 41 and one arm 43 present for each boom 37. This makes it possible to make the movable crane modules of the unloading and loading crane arrangements less wide, so that two adjacent modules can load and unload adjacent bays of containers in a ship. As a result thereof, several adjacent crane modules can operate at the same time, resulting in quicker loading and unloading of a ship.

As is illustrated in FIG. 1, traditional unloading and loading crane arrangements have a hinge 33 in the projecting boom 3. However, according to an aspect of the invention, the booms 37 have a hinge point which is situated on the landside, near the columns 51. As is illustrated in FIGS. 6a-d, the booms 37 pivot together with the arms 41. Arm 41 can therefore be fixedly attached to the boom 37, as a result of which fewer cables with winches are required. This in turn leads to fewer parts which are subject to wear. Also, the boom 37 only requires a small counterweight, if any, since this is already provided by the arm 41. The connections 49 between the arm 41 may consist of a triangular or rectangular dimensionally stable framework beam, strong bars, strong steel cables or other strong materials which are sufficiently sturdy.

With traditional STS cranes, the arm 13 is at the same level as the projecting boom 3. This is necessary because the hoist 7 with its ballast has to be able to pass to and fro from the boom 3 to the arm 13. As a result thereof, counterweight 11 is situated high above the earth's surface, for example at a level of as much as 50 m. Consequently, the centre of gravity of the entire unloading and loading crane arrangement 1 is also situated at a high level, for example still above the arm 13 and on the landside of hinge 33. This is disadvantageous with regard to stability. This is aggravated by the fact that the total weight which can be moved over rails 31 may be between 800 and 2,200 tons.

An aspect of the invention relates to such a form of the displaceable part of the unloading and loading crane arrangement 35, that is to say the crane module, that the centre of gravity thereof is much lower. FIGS. 7a and 7b show another side view of the unloading and loading crane arrangement 35 which has already been shown in earlier figures, but in this case the centre of gravity 73 is clearly indicated and is situated below a horizontal plane in which boom 37 is situated when the latter is in the unloading and loading position (lowered position). This is due to the fact that the arm 43 is connected at a downwardly directed angle to the boom 37 via hinge 39, so that the centre of gravity of the arm 43 (including platform 44 and counterweight 435, if present) is below the horizontal plane in which the boom 37 is located while it is in its operating position. This is advantageous from the point of view of consumption of material and stability. The entire movable crane module can consequently be made more lightweight and only a little, if any, counterweight 45 has to be used. There are fewer dynamic loads.

FIGS. 8a-8d show a further aspect of the invention. FIG. 8a again shows a side view of the unloading and loading crane arrangement 35 which is in the process of unloading a ship 150 by means of hoist 7. According to this aspect of the invention, the unloading and loading crane arrangement 35 has a conveyor floor 75 which, in use, is preferably situated above the quay site (provided there is a quay underneath the unloading and loading crane arrangement). The height of the conveyor floor can be selected freely, depending on the specific situation and the specific overall dimensions of the terminal.

In an embodiment, the gripper 7 of the boom 37 is configured such that it does not go further inland than a position above the conveyor floor 75. This makes it possible to make the design of the boom 37 simpler in an advantageous manner. In particular, it is then possible to omit a mechanism which allows the gripper to go beyond the hinge point 39 or the waterside guide 61, which lowers costs. Incidentally, if no conveyor floor is provided, it is also possible to use this efficient embodiment of the boom 13 and the gripper 7. The space on the quay between waterside columns 51 and the shore, the so-called STS area, can then be used for the temporary storage of containers and ship's hatch covers.

The conveyor floor 75 comprises two conveyor floor parts 751, 752 (see for example FIGS. 8c and 9e), as it were. The first conveyor floor part 751 is defined as that part of the conveyor floor 75 which is accessible to the gripper 7, and the second conveyor floor part 752 is defined as that part of the conveyor floor 75 which is accessible to a second conveyor track between the conveyor floor 75 and the downstream store, such as the transverse conveyor track 77 in FIG. 9e. The two floors may be separated from one another, that is to say they do not overlap one another. This has certain design advantages since there is then no risk of the conveyor track 77 and the gripper 7 being in each other's way. In that case though, the conveyor floor has to be provided with a third transport means for moving the cargo between the first and second conveyor floor 751, 752. Such transport means are described below.

Figure 8A:
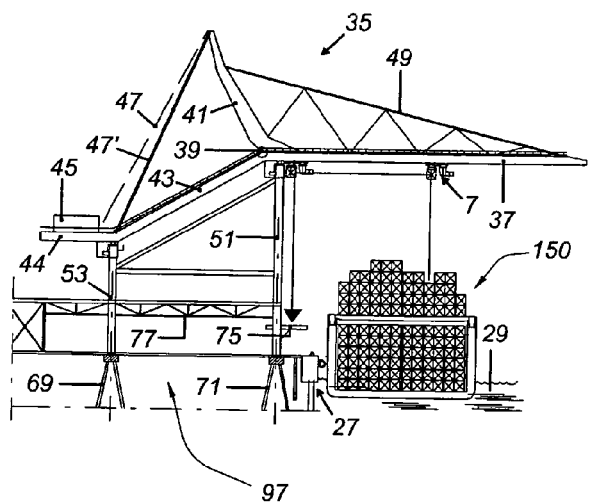
Figure 8B:
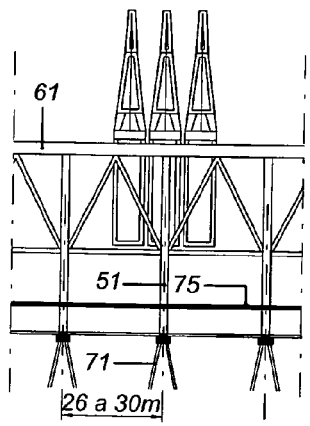
Figure 8C:
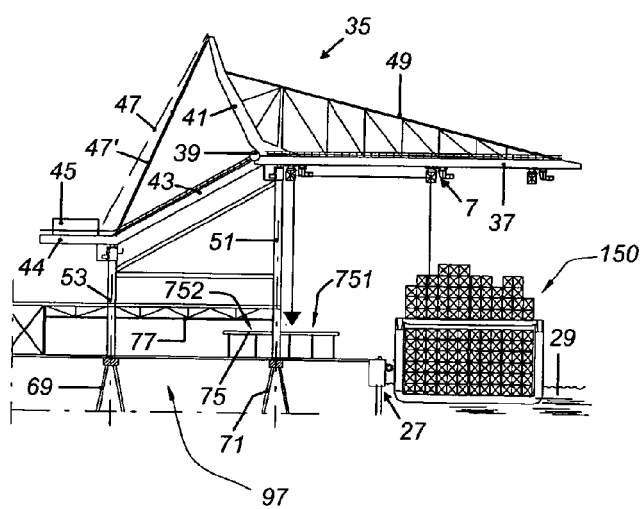
Figure 8D:
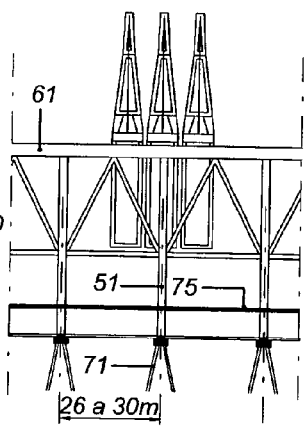

FIGS. 8a and 8b show a quay 27 below the conveyor floor 75. However, it is also possible and advantageous to provide this floor if the conveyor floor is provided at least partly above water 29, for example if columns 51 and/or 53 are not fitted on a quay 27, but in a bed 29'. If a quay 27 is present, operators can walk underneath this conveyor floor 75 and vehicles can then also move underneath this conveyor floor 75. The conveyor floor 75 is, for example, connected to columns 51 by means of suitable support means which support the conveyor floor 75 in such a manner that it can carry a predetermined number of containers on a predetermined surface. However, if the fixed structure is situated completely or partly offshore, a walkway and/or bridge structure at quay level may be provided underneath the conveyor floor 75, if desired (see also FIGS. 2m and 2n).

Conveyor floor 75 extends along quay 27 in the longitudinal direction, as can be seen in FIG. 8b which shows a front view of the unloading and loading crane arrangement 35 viewed from the water 29. In order to be able to take containers from the conveyor floor 75 inland to a further storage location, the unloading and loading arrangement 35 comprises a transverse conveyor track 77 which is supported by columns 51, 53 in a suitable manner, for example. The conveyor track 77 is provided with a suitable hoist 79, 80 which can be moved to a position above the conveyor floor 75 by means of drive means which are known per se. This hoist 79, 80 is configured to grip containers from the conveyor floor 75, lift them up, move them inland underneath the transverse conveyor track 77 and set them down behind the unloading and loading crane arrangement 35, for example on the ground (but this may also be higher or lower). There, the containers can be placed on lorries or goods carriages by means of further transporting means for further transportation.

The transverse conveyor tracks 77 run as far as the waterside row of columns 51, so that a complete integration of the STS area and the stack area is achieved. The overhead cranes 79 can thus move containers from the conveyor floor 75 to the stacks without the use of other transport means. Of course, this also applies in the other direction, i.e. from the stacks to the ship.

Obviously, the conveyor track 77 with its hoist can also be used for transporting containers in the opposite direction, that is to say from a storage location inland from unloading and loading device 35 to the conveyor floor 75 in order to then be loaded onto a ship.

The upper part of the unloading and loading crane module 35 takes the container out of the ship to a position on the conveyor floor 75 which, in this example, is situated at a height of approximately 11 to 12 meters above the quay level on the waterside of the outer structure of columns 51. The width of the conveyor floor may be chosen freely depending on the desired throughput capacity and on the desired unloading and loading speed. The height position of the conveyor floor with respect to the quay level can also be chosen freely depending on the other functions on the quay.

FIGS. 9a-9d and 10a-10b show a conveyor floor 75 which is provided with two longitudinal conveyor tracks 94 and 95 on the waterside of series of columns 51, and a longitudinal conveyor track 93 on the quayside of series of columns 51. The longitudinal conveyor tracks 93, 94, 95 illustrated by way of example consist, for example, of a fixed rail or crane rail structure, two rails 89 per track, but may also consist of a fixed steel "trench" profile, two trenches per track or even of a completely flat floor, as is illustrated in FIG. 9e. There are sufficient vehicles 81 on the rail tracks for the crane module 35 to lower the containers onto. The rail tracks are provided with points 96, so that, for example, a vehicle 81 which moves along the longitudinal conveyor track 94 can move onto conveyor track 93. The vehicles 81 can be moved manually, independently, or automatically across the conveyor floor in the longitudinal direction. In the case of a flat floor or in the case that for example both transversal guides and a longitudinal guides for the vehicle 81 are provided in the floor 75, the vehicles 81 can also move or be moved in the transverse direction within the range of the transport means 79. Thus, the vehicles with a container can be placed in a suitable location, so that the overhead crane 79 can lift the containers, following which the container is moved along the transverse conveyor track 77. This prevents, in an advantageous manner, the exact longitudinal position of the ship, in particular the relative positioning of the container bays of the ship with respect to the transverse conveyor tracks 77 of the crane module 35, from being of crucial importance to the loading or unloading of containers.

It will be clear to the person skilled in the art that where transverse and longitudinal conveyor tracks 77, 93, 94, 95 are discussed, it is in principle also possible to provide these conveyor tracks in and above the quay without a conveyor floor 75 being provided. Thus, the longitudinal conveyor tracks 93, 94, 95 may be provided, for example in the STS area, and the transverse conveyor track 77 may run into these. However, a number of advantages of the use of conveyor tracks which serve a raised unloading and loading floor 75 is then lost. Thus, for example, the safety at quay level is not improved, the conveyor tracks are susceptible to damage by other traffic on the quay, off-shore crane arrangements are no longer possible or far less practical, etc.

Instead of providing one or more longitudinal conveyor tracks on the conveyor floor 75, it is for example also possible, on an otherwise flat conveyor floor, to use an All-Directional Automated Guided Vehicle (AGV) (not shown) on the conveyor floor which is, for example, guided by a laser. In another embodiment of the conveyor floor comprising longitudinal and transversal (rail) guides a special Two-Directional AGV can be used (see FIG. 18a-c).

In an advantageous embodiment, the unloading and loading crane arrangement 35 comprises two or more transverse conveyor tracks 77 which are arranged next to one another and which extend transversely with respect to the quay 27 (see FIGS. 10a and 10b).

It is particularly advantageous if the mutual distance between such adjacent conveyor tracks 77 measured in the longitudinal direction of the quay 27 and between the axes of the conveyor tracks 77 is as great as the distance which a whole number of containers, including the intermediate space, takes up on a ship in the longitudinal direction of the containers. There are fixed standard distances for this purpose, so that said intermediate distance can be determined beforehand in a simple manner. Such dimensional accuracy between the axes of the conveyor tracks 77 makes it possible to stack containers at the storage location on land in the same way and at approximately the same intermediate distance as on the ship. In other words: the grid pattern size is adapted to the stack size. This substantially increases the effective floor surface on the land on which containers can be stored. No space is required on the land anymore for freely movable transport means such as straddle carriers. The distance between two conveyor tracks 77 is, for example, approximately substantially equal to the width of one container bay in which, for example, four 20-foot containers or two 40-foot containers of a ship fit. The distance between tracks 77 may also be equal to twice the width, including an aisle in between, of a container bay, as is illustrated in FIG. 10a. In general, it is therefore advantageous if the distance between two conveyor tracks 77 is an integer multiple of the width, including intermediate spaces, of container bays of a ship.

When there are several unloading and loading crane modules, according to an aspect of the invention, the distance in between is adapted to this intermediate distance between adjacent conveyor tracks. The dimensions of these unloading and loading crane modules may be such that they can be brought so close together that two adjacent unloading and loading modules can process adjacent bays of containers simultaneously.

By way of example, a width of the conveyor floor 75 of approximately 7 to 8 m may be chosen, as a result of which the two illustrated longitudinal conveyor tracks 94, 95 can be realized adjacent to the waterside of the outer structure of columns 51. As has already been mentioned, the example from FIG. 9*a* has one conveyor track 93 on the inner side of the outer structure of columns 51. However, the invention can also be realized using different numbers of longitudinal conveyor tracks on the landside and/or the waterside.

Thus, there is a trend at current container terminals for 6 STS cranes to be operational simultaneously next to one another. In order to be able to unload the ship quickly, at least three longitudinal conveyor tracks are required on the outer side of the row of columns 51.

In order to be able to simultaneously load the ship quickly, three conveyor tracks have to be provided on the inner side of the row of columns 51, the relevant parts being as shown in FIG. 9*e*.

The selection has to be adapted to the desired processing speed and to the desired redundancy options in case of failures. The points 96 of the rail tracks 93, 94, 95 illustrated in FIGS. 10*a* and 10*b*, for example, make it possible to guide vehicles 81 around congestion on a particular longitudinal conveyor track.

With a chosen "lane width" (the width between conveyor tracks 77, see for example FIG. 10*a*) in the stack area 99 of approximately 27 to 30 meters which is also continued in the buffer-in area 97, the longitudinal transportation of the containers via, for example, longitudinal conveyor tracks 93, 94, 95 on the conveyor floor will remain very limited. If this "lane width" is moreover adapted to the width of the "bays" on the ship, the necessity of longitudinal transportation on the conveyor floor is limited further to a minimum.

The terminal lay-out is chosen such that sufficient flexibility is offered with regard to the current ships. Embodiments of the invention make it possible for all containers on the longitudinal conveyor tracks (which form part of the conveyor floor 75) to be moved, manually, or with a chain system, or semi-automatically, or completely automatically, to within the "lane width" of the buffer-in area 97 which is preferably substantially equal to the "lane width" of the stack area 99.

Figure 9A:
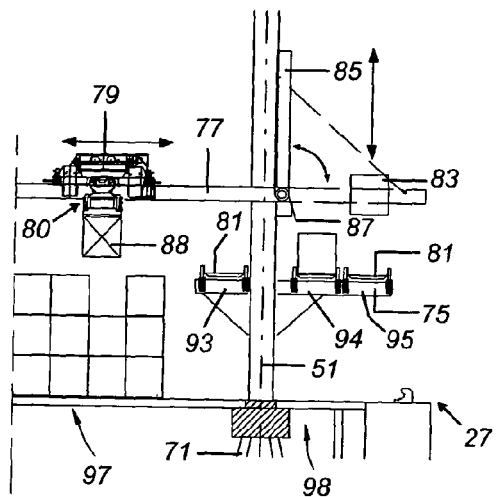
Figure 9B:
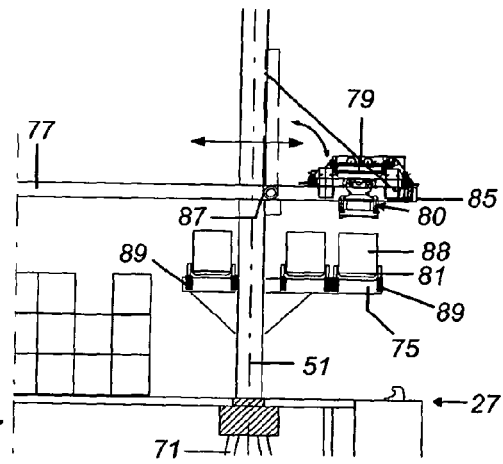
Figure 9C:
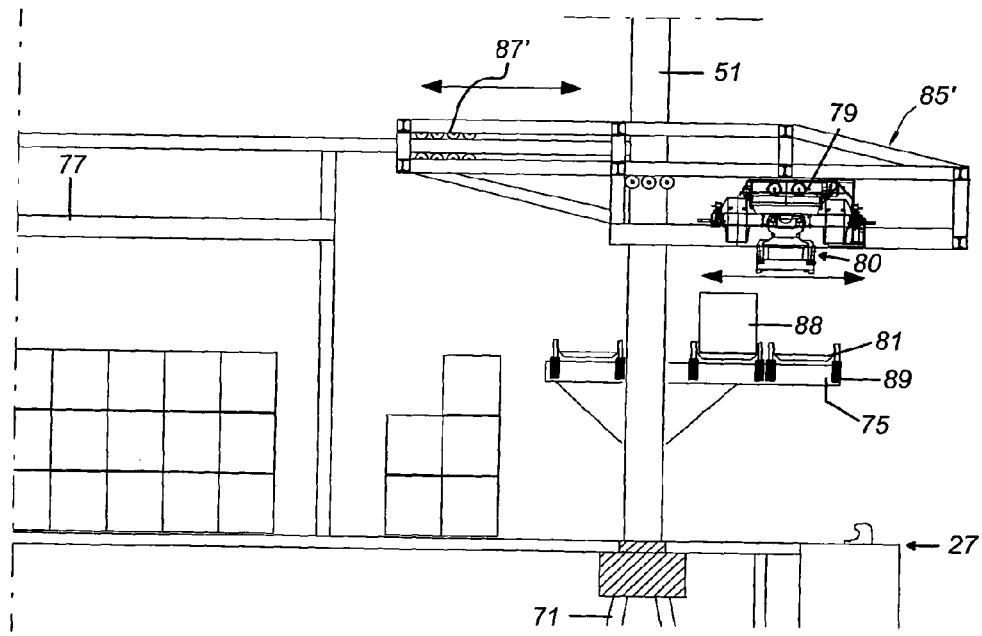

By incorporating one or more points structures into the conveyor floor, containers can also be transported to the inner side of the fixed structure without having to use the fold-out overhead crane system 85 (see FIGS. 9*a*, 9*b*) or displacement device 87' (see FIGS. 9*c*, 9*d*).

The track points system 96 on the conveyor floor increases the flexibility and is not only necessary in case of a local malfunction. Apart from the above-described small longitudinal displacements along the conveyor floor, it is of course also possible to move containers across large distances over the conveyor floor 75 in the longitudinal direction, should this be necessary.

A further aspect focuses on the use of the conveyor track 77 with dedicated hoist or dedicated robot device 79, as clarified further in FIGS. 9*a* and 9*b*. The conveyor track 77 extends as far as column 51 and is supported by the latter. Via a hinge 87, the conveyor track 77 is connected to a subconveyor track 85 which, in use, can be swung above the conveyor floor 75 in such a manner that the latter extends in line with conveyor track 77. A robot 79 with suitable hoist 80 can be driven in a transverse direction over the conveyor track 77 by suitable drive means. In use, the subconveyor track 85 is in a downward position and the robot 79 can move from the conveyor track 77 to the subconveyor track 85 and vice versa, as is indicated in FIG. 9*b*.

FIG. 9*a* shows how containers are stacked in the buffer-in area 97 on the quay between columns 51 and 53. The figure shows how hoist 80 of robot device 79 has taken a container 88 out of the stack and lifted it to a higher position. FIG. 9*b* shows how this container 88 is moved to a position above a vehicle 81 by means of the robot 79, where the container 88 is placed on the vehicle 81. Vehicle 81 is placed on one of the longitudinal conveyor tracks 93, 94, 95 on conveyor floor 75 and is displaceable in a direction along quay 27. Vehicle 81 can be moved by means of suitable drive means, optionally manually or automatically. By means of vehicle 81, containers can still be displaced in the longitudinal direction before they are loaded onto the ship by means of hoist 7. This is necessary in situations where the stacking of containers on the ship in the longitudinal direction of the quay 27 does not exactly match the stacking in the buffer-in area. Instead of a vehicle, it is also possible to use a conveyor belt, for example in the form of a chain.

FIGS. 9*a* and 9*b* show the process when a container is moved from the buffer-in area onto the ship. Obviously, it also works in the opposite direction.

FIG. 9*a* also shows a container 83 which is held by hoist 7 (not illustrated in FIG. 9*a*) and is in the middle of an upward/downward movement in order to be placed on the vehicle 81 or to be lifted from the latter. At the location of the conveyor track 77, such a container 83 with hoist 7 must not collide with subconveyor track 85. Therefore, subconveyor track 85 is at that point in time pulled upwards about hinge 87 so that it is not on the path of the container 83.

In order to ensure that the subconveyor track 85 is not on the path of hoist 7 with container 83 when the container 83 is at the location of the conveyor track 77, the structure can also be configured in such a way that the subconveyor track 85 can be retracted or extended in the transverse direction, at right angles to the quay 27 (see FIGS. 9*c* and 9*d*), via displacement device 87'. When retracted, subconveyor track 85' is not situated above vehicles 81 and not on the path of hoist 7 with container 83. When extended, subconveyor track 85' is situated above vehicle 81 so that robot 79 can move to a position above vehicle 81 and can load and unload containers there.

As is illustrated in FIG. 9*e*, it is also possible, as an alternative to the provision of a subconveyor track, to use an All-Directional AGV or a Two-Directional AGV to move cargo on the conveyor floor as illustrated in FIG. 11*b*. These All- or Two-Directional AGVs are capable of moving both in the longitudinal and in the transverse direction without changing the orientation of the cargo it is transporting. As a result thereof, the AGV can position itself in a spot where the AGV is accessible to the gripper of the boom and can then move in the longitudinal and transverse direction to a spot which is accessible to the gripper 79 of the transverse conveyor track 77. The use of such AGVs then makes the hinged or slidable subconveyor track redundant.

FIGS. 10*a-b* and 11*a-b* clarify certain aspects by means of diagrammatic top views and a view in perspective. It can clearly be seen that vehicles 81 can be displaced in the longitudinal direction along the quay 27 in order to match the stacking on the quayside with that on the ship. Reference numeral 79 shows a robot in its position on the subconveyor track 85 above a vehicle 81 in order to load or unload a container. Reference numeral 79' refers to a robot in a position above the buffer-in area 97.

FIG. 12 shows an overview of a known container terminal. The terminal has a buffer-in area 2, substantially between the waterside rails 25 and the landside rails 23, underneath the boom 3*a*, 3*b* and fixed arm 13 of the crane module 1. Behind it, in the landside direction, the stack area 4 is situated, and in an adjacent part 6, lorries can be loaded and unloaded.

Containers on sea-going vessels are usually stacked in the longitudinal direction of the ship, in other words the longitudinal axis of the containers runs parallel to the longitudinal axis of the ship. The known STS cranes or crane modules 1 lift the containers from the ship and place them in the buffer-in area 2 without turning them, i.e. the longitudinal axis of the containers still runs parallel to the quay. From the buffer-in area 2, the containers are moved to the storage site in the stack area 4 by means of straddle carriers, tractors or reach-stackers 103. During this move, the containers are usually turned by 90°, so that the longitudinal axis ends up at right angles to the quay.

FIG. 13a shows an embodiment according to a particularly advantageous aspect of the invention, in which the dimensions of the STS (crane) area 98, the buffer-in area 97, the stack area 99 and the lorry-loading area 99' are matched to one another. In the STS or crane area, that is to say the area 98 between the quay 27 and the outer structure of columns 51, a small longitudinal displacement is only necessary for a small number of the containers and this takes place on the conveyor floor, in this example at approximately 11 to 12 m above quay level.

The buffer-in area 97, the stack area 99 situated behind it and the lorry-loading area 99' are of exactly the same width, so that further longitudinal moves are, in principle, not necessary.

The above-described embodiment removes the need for rotating containers and also reduces the number of meters to be traveled by the container. As a result thereof, the throughput speed of the container terminal is improved and the energy consumption is reduced. Less travel for the containers means less wasted space and also less wear, less $CO_2$ and fewer emissions of fine particulate matter, less noise and fewer safety risks.

Containers at the terminal are mainly transported by means of robot devices or overhead cranes 79 along conveyor tracks 77. This has the advantage of a relatively low own weight of this transport means compared to the weight to be displaced and the low rolling friction of the steel wheels on the steel rails. The drive mechanism for both lifting and driving is electrical, thus saving on (fossil) fuel and resulting in lower emissions, less $CO_2$, less noise and, if desired, 100% automation.

By means of the described advantageous embodiment, lorries can be loaded in zone 99' without the lorries having to enter the terminal site. In addition, depending on the location of the rail tracks, trains can be loaded by means of the same system.

FIGS. 13b and 13c show a diagrammatic illustration of the loading and unloading process in a specific situation. The transportation of containers at the terminal can be fully automated as the position in the horizontal and in the vertical plane of each container is known and the distances are traveled according to preprogrammable routes which are at right angles to one another and using preprogammable transport means and speeds. Traffic never has to cross at the same level. FIG. 13d shows a further diagrammatic illustration of the loading and unloading process. It is similar to the example of FIG. 13c, except that the vehicles are made to move in (clockwise) loops, which advantageously reduces the chance that two vehicles obstruct each other.

The loading process and the unloading process can be carried out simultaneously by one STS crane module, which is an important requirement for the latest generation of container terminals.

As a result of the integration of the transport systems of the stack area (77, 79, 79') as far as above the conveyor floor 75 in the STS area, all containers can be transported from or to the ship over the quay site without the use of other means of transport, such as straddle carriers, terminal tractors and AGVs. This results in a higher processing speed, less waste of space, shorter distances, increased safety and fewer polluting effects.

FIG. 14 shows an impression of the installation by means of which containers can be loaded onto lorries or goods carriages from the storage space or can be unloaded therefrom. In the embodiment from FIG. 14, the conveyor track 77 not only extends to a position above the storage space, but also above a road on which lorries can drive. The same robots 79 with hoists 80 can be used to carry out the loading and unloading.

However, in an alternative embodiment, additional robots are provided for this purpose. This obviously means that these will have to operate in tune with the robots 79 which are on the same conveyor tracks 77. In order to achieve a flexible procedure of loading and unloading the lorries, the hoist 80 is preferably configured such that it can also be displaced at right angles to the direction of the conveyor tracks 77, i.e. in a longitudinal direction of the stored containers and in the direction of travel of lorries on the road.

Due to these measures, it is possible to achieve a substantial energy saving and to load and unload more quickly. In addition, there will be less noise and it will be possible to increase the degree of automation.

FIG. 15 shows a scan area 100 situated between the buffer-in area 97 and the stack area 99. In FIG. 15, the scan area 100 forms a transverse strip which is provided with scan tracks 101. In the present example, the scan tracks 101 run in substantially longitudinal direction, i.e. parallel to the quay. Furthermore, a container inspection system 102, 103 is provided in the scan area 100, in the present example in the form of an Integrated Container Inspection System (ICIS), see also FIG. 16 and FIG. 17. The following are used as part of the system: a VACIS portal (Vehicle And Cargo Inspection System), a module for radiation monitoring ("Radiation portal monitoring"), an OCR module (automated container identification), and an "Empty view system".

In a variant which is particularly advantageous if the conveyor floor 75 is completely or partly above water 29 and as a result thereof little or no stack space is present between the columns 51 and 53, the scan area 100 can also be provided essentially at the level of the conveyor floor, substantially between or near columns 51 and 53. The scan area 100 can then also be integrated with the conveyor floor 75, in particular the longitudinal tracks 93, 94, 95 of the conveyor floor 75 can be shared with the scan tracks 101.

Preferably, use is made of a mobile scanning installation 103. Known mobile scanning installations make it possible to drive over and along containers at a speed of 10 to 20 km per hour or more and to generate complete scanning results while simultaneously communicating with a central ICIS server via a high-speed wireless network.

According to an embodiment of the invention, the scanning can, if desired, be carried out over and along container stacks which are three units high. Furthermore, the area 100 where scanning takes place is not manned and therefore no health risks will result from the radiation used in the scanning process.

When dealing with small number of containers, the overhead cranes 79 along the conveyor tracks 77 can take the containers from the conveyor floor 75 and place them directly on a scanning track 101 in a predetermined number of rows which are, for example, three units high. In this case, no temporary storage in the buffer-in area 97 is necessary. After scanning, the containers are transported to the stacks or stack area 99 by means of overhead cranes 79.

When dealing with large numbers of containers, the containers will be placed both in the buffer-in area 97 and in the scan area 100, and the scanning will continue during the off-peak hours.

The mobile scanning installation 103 can be controlled manually, semi-automatically or completely automatically. The overhead cranes 79 can be programmed to place the containers, for example at night, according to fixed patterns and frequencies on the scanning tracks 101 and transport them on to the stack area 99 after scanning.

The advantage is that, depending on the number of tracks and the number of mobile scanning installations, all containers can be scanned before they are placed in the stack area.

In known container terminals, containers are only scanned at random. In known container terminals, the selected containers to be scanned are driven by a lorry or other terminal vehicle to a fixed scanning installation. The invention, an embodiment of which is illustrated in FIGS. 15, 16 and 17, makes it possible in practice to check all containers, which is highly desirable from the point of view of safety and traceability.

Except for scanning, the transverse scan tracks 101 can also be used to displace containers in the longitudinal direction, i.e. parallel to the quay, from one track to the other or from one stack 99 to the other in case there are failures or emergency situations in other parts of the terminal.

In terminals where the loading of ships forms an important part of container transport, the conveyor tracks 101 can mainly be used for the transportation of containers from the stacks to the ship. This makes simultaneous unloading and loading, the so-called dual-cycling, possible in an optimum manner. For example, if the longitudinal conveyor tracks 93, 94, 95 on the conveyor floor 75 are used to transport the containers away from the ship, the longitudinal conveyor tracks 101 can be used simultaneously to transport other containers to the ship. Both the overhead cranes 79 and the STS crane modules 35 can then always return fully loaded to the location where the unloading procedure is taking place at that point in time.

In the transverse scanning area 100, several conveyor tracks 101 are installed on railway or crane rails, two per track, or in recessed trenches or on flat floors on which the containers are put down by the overhead cranes on wheel sets which have been coupled together. As a result thereof, it is also possible to displace the containers in the longitudinal direction.

The mobile scanning installation also drives in the longitudinal direction of the terminal along a dedicated, optionally raised or recessed rail system, the gauge of which can be adapted, as desired, to the number of conveyor tracks in the transverse strip, as is illustrated in FIG. 17.

FIGS. 18*a-b* schematically show a vehicle 810 that is particularly well-suited for use as transport vehicle 81 on a conveyor floor 75, as shown in FIG. 18*c*. The vehicle 810 comprises an upper part 801, suitable for supporting a container, and one or more undercarriages 802 (in the present example, three undercarriages). Each undercarriage 802 is provided with an engine or other drive means for moving the undercarriage and comprises two rows of longitudinal wheels 803 (in the present example with three wheels in a row) and two rows of transversal wheels 804. The longitudinal wheels and the transversal wheels are perpendicular to each other.

The undercarriage is provided with means for raising and lowering the rows of wheels 803. The rows of wheels 803, 804 are thus arranged in the undercarriage 802 in such a manner that the undercarriage 802 may be moved up and down (along direction u). When the longitudinal rows 803 are lowered, the undercarriage is moved up (see FIG. 18*a*(1)) and the longitudinal wheels will support the vehicle 810. The vehicle can then move in a longitudinal direction. When the longitudinal rows 803 are raised, the undercarriage is lowered until such point that the transversal rows of wheels 804 will support the undercarriage (18*a*(2)). The vehicle is then ready to move in a transversal direction.

Many variations of this general principle are possible. For example, it is possible to keep the longitudinal wheels 803 fixed with respect to the undercarriage 802 and make the transversal wheels 804 vertically moveable along direction u. The number of wheels, rows, and undercarriages can be varied.

The vehicle 810 may be made of relatively (compared to known AGVs) light-weight materials, such as synthetic materials. In particular the upper part 801 and/or the wheels can be made of synthetic materials to reduce weight. The basic principle of two-directional vehicle 810, which allows only two basic directions of movement, and for example no diagonal movement, allows for a simple and robust design, unlike known all-directional AGVs. When the vehicles weigh less, the demands on the structure of conveyor floor 75 are reduced, allowing a less expensive construction.

FIG. 18*c* shows a vehicle 810 on conveyor floor 750, which floor is provided with longitudinal guides 811 for the longitudinal wheels 803 and transversal guides 812 for the transversal wheels. It is also possible to provide electric conductors in the conveyor floor or in or on the guides for powering an electric motor in vehicle 810. In that case, the vehicle can independently and automatically move using an electrical engine in the vehicle, and does not need to be provided with a battery that must also regularly be recharged.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. Unloading and loading crane arrangement (35) comprising:
   a boom (37) for unloading cargo from or loading cargo onto a ship using a gripper (7) attached to the boom;
   a transverse conveyor track (77) with a transport means for moving the unloaded cargo inland in the transverse direction and moving the cargo to be loaded shipward; and
   a conveyor floor (75) adapted to support an Automatic Guided Vehicle (AGV) (81) that is movable in at least two directions, including the transverse direction, across the conveyor floor for displacing cargo, the conveyor floor having a first conveyor floor part (751) where the AGV receives a cargo from the gripper (7) and a cargo on the AGV is presented to the gripper (7), and a second conveyor floor part (752) for presenting cargo from the AGV to the transport means of the transverse conveyor track (77) and receiving cargo on the AGV from the transport means of the transverse conveyor track.

2. Unloading and loading crane arrangement (35) according to claim 1, wherein the boom (37) is hingedly connected to an arm (43) via a hinge point (39), which arm (43) is placed on at least one landside guide (59) and one waterside guide (61), which guides (59, 61) are supported by respective landside and waterside columns (53, 51).

3. Unloading and loading crane arrangement (35) according to claim 2, wherein the waterside guide (61) is placed at a higher level than the landside guide (59).

4. Unloading and loading crane arrangement (35) according to claim 2, wherein the first conveyor floor part (751) extends largely on the waterside of the waterside columns (51), and the second conveyor floor part (752) extends largely on the landside of the waterside columns (53).

5. Unloading and loading crane arrangement (35) according to claim 4, wherein the waterside guide (61) is placed at a higher level than the landside guide (59).

6. Unloading and loading crane arrangement (35) according to claim 1, wherein the AGV is an All-Directional AGV or a Two-Directional AGV (810).

7. Unloading and loading crane arrangement (35) according to claim 1, wherein the conveyor floor (75) is provided with at least one longitudinal conveyor track (93, 94, 95) over which the AGV is displaceable.

8. Unloading and loading crane arrangement (35) according to claim 1 with at least two transverse conveyor tracks (77), wherein the lane width between the at least two transverse conveyor tracks (77) is an integer multiple of a standardized container bay width of a ship.

9. Unloading and loading crane arrangement (35) according to claim 1, wherein the conveyor track (77) is provided with a subconveyor track (85) which, in a first position, is situated substantially above the conveyor floor (75) and, in a second position, leaves the space above the conveyor floor (75) free.

10. Unloading and loading crane arrangement (35) according to claim 9, wherein the subconveyor track (85) is pivotable with respect to the transverse conveyor track (77) by means of a hinge (87).

11. Unloading and loading crane arrangement (35) according to claim 9, wherein the subconveyor track (85) is displaceable in the longitudinal direction of the transverse conveyor track (77) via a displacement device (87').

12. Container terminal, comprising:
the unloading and loading crane module (35) according to claim 1 which is secured in one of a quay (27) and a bed (29') by means of columns (51, 53);
a buffer-in area (97) which, depending on the presence of a quay surface (21), may be situated between columns (51, 53) or further inland, for temporarily storing cargo;
a stack area (99) which may be situated substantially on the inland side of the buffer-in area (97) for longer term storage of cargo;
wherein the transverse conveyor track (77) of the unloading and loading crane module (35) is configured to move cargo from the conveyor floor selectively to the buffer-in area (97) or the stack area (99).

13. Container terminal according to claim 12, furthermore provided with a loading and unloading area (99') for loading cargo onto and unloading cargo from lorries, wherein the conveyor track is also configured to move cargo from and to the loading and unloading area (99').

14. Unloading and loading crane (35) according to claim 1, wherein the AGV is a Two-Directional AGV (810) comprising longitudinal wheels (803) oriented in a longitudinal direction and transverse wheels (804) oriented in a transverse direction.

15. Unloading and loading crane (35) according to claim 14, wherein the longitudinal (803) or the transverse (804) wheels of the Two-Directional AGV (810) are arranged to be retractable, so that the Two-Directional AGV is selectively supported by the longitudinal or transverse wheels.

16. Method for unloading a ship with the unloading and loading crane module (35) according to claim 1, which method comprises:
lifting cargo from a ship using the gripper (7) of the unloading and loading crane module (35);
placing the cargo on the AGV (81) on the first conveyor floor part (751) of the conveyor floor (75);
moving the AGV (81) to the second conveyor floor part (752) of the conveyor floor (75); and
directly and selectively moving the cargo from the conveyor floor (75) to one of a buffer-in area (97), scan area (100), stack area (99), and loading and unloading area (99').

17. Method for unloading a ship with the unloading and loading crane module (35) according to claim 1, which method comprises:
lifting cargo from a ship using the gripper (7) of the unloading and loading crane module (35);
placing the cargo on the AGV (81) on the first conveyor floor part (751) of the conveyor floor (75);
moving the AGV (81) to the second conveyor floor part (752) of the conveyor floor (75); and
directly and selectively moving the cargo from the conveyor floor (75) to one of a buffer-in area (97), scan area (100), stack area (99), and loading and unloading area (99').

\* \* \* \* \*